(12) United States Patent
Srinivasan

(10) Patent No.: US 7,110,459 B2
(45) Date of Patent: Sep. 19, 2006

(54) APPROXIMATE BICUBIC FILTER

(75) Inventor: Sridhar Srinivasan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 744 days.

(21) Appl. No.: 10/379,606

(22) Filed: Mar. 4, 2003

(65) Prior Publication Data

US 2003/0194009 A1   Oct. 16, 2003

Related U.S. Application Data

(60) Provisional application No. 60/371,860, filed on Apr. 10, 2002.

(51) Int. Cl.
*H04N 7/12* (2006.01)

(52) U.S. Cl. ............ 375/240.29; 375/240; 375/240.01; 375/240.12

(58) Field of Classification Search .......... 375/240.29, 375/240, 240.01, 240.12
See application file for complete search history.

(56) References Cited

U.S. PATENT DOCUMENTS

| | | |
|---|---|---|
| 4,862,267 A | 8/1989 | Gillard et al. |
| 5,103,306 A | 4/1992 | Weiman et al. |
| 5,491,523 A | 2/1996 | Sato |
| 5,623,311 A | 4/1997 | Phillips et al. |
| 5,659,365 A | 8/1997 | Wilkinson |
| 5,692,063 A | 11/1997 | Lee et al. |
| 5,784,175 A | 7/1998 | Lee |
| 5,787,203 A | 7/1998 | Lee et al. |
| 5,796,855 A | 8/1998 | Lee |
| 5,799,113 A | 8/1998 | Lee |
| 5,825,929 A | 10/1998 | Chen et al. |
| 5,844,613 A | 12/1998 | Chaddha |
| 5,874,995 A | 2/1999 | Naimpally et al. |
| 5,901,248 A | 5/1999 | Fandrianto et al. |
| 5,929,940 A | 7/1999 | Jeannin |
| 5,970,173 A | 10/1999 | Lee et al. |
| 5,973,755 A | 10/1999 | Gabriel |
| 5,982,438 A | 11/1999 | Lin et al. |
| 6,005,980 A | 12/1999 | Eifrig et al. |
| 6,067,322 A | 5/2000 | Wang |
| 6,130,963 A | 10/2000 | Uz et al. |
| 6,219,464 B1 | 4/2001 | Greggain et al. |
| 6,233,017 B1 | 5/2001 | Chaddha |
| 6,281,942 B1 | 8/2001 | Wang |
| 6,282,243 B1 | 8/2001 | Kazui et al. |
| 6,295,376 B1 | 9/2001 | Nakaya |
| 6,320,593 B1 | 11/2001 | Sachs et al. |
| 6,337,881 B1 | 1/2002 | Chaddha |

(Continued)

FOREIGN PATENT DOCUMENTS

EP   0863675   9/1998

(Continued)

OTHER PUBLICATIONS

Bartkowiak et al., "Color Video Compression Based on Chrominance Vector Quantization," *7th International Workshop on Systems, Signals and Image Processing*, IWSSIP 2000, Maribor 7-9 VI, pp. 107-110 (2000).

(Continued)

*Primary Examiner*—Allen Wong
(74) *Attorney, Agent, or Firm*—Klarquist Sparkman, LLP

(57) ABSTRACT

Various techniques and tools for approximate bicubic filtering are described. For example, during motion estimation and compensation, a video encoder uses approximate bicubic filtering when computing pixel values at quarter-pixel positions in reference video frames. Or, during motion compensation, a video decoder uses approximate bicubic filtering when computing pixel values at quarter-pixel positions.

25 Claims, 13 Drawing Sheets

U.S. PATENT DOCUMENTS

| | | | |
|---|---|---|---|
| 6,377,628 | B1 | 4/2002 | Schultz et al. |
| 6,381,279 | B1 | 4/2002 | Taubman |
| 6,396,876 | B1 * | 5/2002 | Babonneau et al. ... 375/240.29 |
| 6,418,166 | B1 | 7/2002 | Wu et al. |
| 6,539,056 | B1 | 3/2003 | Sato et al. |
| 6,650,781 | B1 | 11/2003 | Nakaya |
| 6,728,317 | B1 | 4/2004 | Demos |
| 2002/0186890 | A1 | 12/2002 | Lee et al. |
| 2003/0112864 | A1 | 6/2003 | Karczewicz et al. |
| 2003/0152146 | A1 | 8/2003 | Lin et al. |
| 2003/0156646 | A1 | 8/2003 | Hsu et al. |
| 2003/0202705 | A1 | 10/2003 | Sun |

FOREIGN PATENT DOCUMENTS

| | | |
|---|---|---|
| EP | 0884912 | 12/1998 |
| GB | 2343579 | 10/2000 |
| WO | WO 00/33581 | 6/2000 |
| WO | WO 03/026296 | 3/2003 |

OTHER PUBLICATIONS

Flierl et al., "Multihypothesis Motion Estimation for Video Coding," *Proc. DCC*, 10 pp. (Mar. 2001).

Girod, "Efficiency Analysis of Multihypothesis Motion-Compensated Prediction for Video Coding," *IEEE Transactions on Image Processing*, vol. 9, No. 2, pp. 173-183 (Feb. 2000).

ITU—Q15-F-24, "MVC Video Codec—Proposal for H.26L," Study Group 16, Video Coding Experts Group (Question 15), 28 pp. (document marked as generated in 1998).

Konrad et al., "On motion modeling and estimation for very low bit rate video coding," *Visual Communications and Image Processing VCIP'95*, 12 pp. (May 1995).

"Overview of MPEG-2 Test Model 5," 5 pp., downloaded from http://www.mpeg.org/MSSG/tm5/Overview.html on Jan. 12, 2006.

"The TML Project WEB-Page and Archive" (including pages of code marked "image.cpp for H.26L decoder, Copyright 1999" and "image.c"), 24 pp., downloaded from http://www.stewe.org/vceg.org/archive.htm on Jun. 1, 2005.

U.S. Appl. No. 60/341,674, filed Dec. 17, 2001, Lee et al.

Benzler et al., "Improving multiresolution motion compensating hybrid coding by drift reduction," *Picture Coding Symposium*, 4 pp. (1996).

Benzler et al., "Motion and aliasing compensating prediction with quarter-pel accuracy and adaptive overlapping blocks as proposal for MPEG-4 tool evaluation—Technical description," ISO/IEC JTC1/SC29/WG11, MPEG 95/0552, 5 pp., document marked 1995.

Benzler, "Results of core experiment P8 (Motion an Aliasing compensating Prediction)," ISO/IEC JTC1/SC29/WG11, MPEG97/2625, 8 pp., document marked 1997.

Davis et al., "Equivalence of subpixel motion estimators based on optical flow and block matching," *IEEE Proceedings of the International Symposium on Computer Vision*, pp. 7-12 (1995).

de Haan et al., "Sub-pixel motion estimation with 3-D recursive search block-matching," *Signal Processing: Image Communication 6*, pp. 229-239 (1994).

Ebrahimi, "MPEG-4 Video Verification Model Version 10.0," ISO/IEC JTC1/SC29/WG11, MPEG98/N1992, pp. 1, 43-52, 72-74, 123-130, and 190, document marked 1998.

Ericsson, "Fixed and Adaptive Predictors for Hybrid Predictive/Transform Coding," *IEEE Transactions on Communications*, vol. COM-33, No. 12, pp. 1291-1302 (1985).

Girod, "Motion-Compensating Prediction with Fractional-Pel Accuracy," *IEEE Transactions on Communications*, vol. 41, No. 4, pp. 604-612 (1993).

Girod, "Motion Compensation: Visual Aspects, Accuracy, and Fundamental Limits," *Motion Analysis and Image Sequence Processing*, Kluwer Academic Publishers, pp. 125-152 (1993).

Horn et al., "Estimation of motion vector fields for multiscale motion compensation," *Proceedings Picture Coding Symposium (PCS 97)*, pp. 141-144 (Sep. 1997).

Keys, "Cubic Convolution Interpolation for Digital Image Processing," *IEEE Transactions on Acoustics, Speech, and Signal Processing*, vol. ASSP-29, No. 6, pp. 1153-1160 (1981).

Lopes et al., "Analysis of spatial transform motion estimation with overlapped compensation and fractional-pixel accuracy," *IEE Procs.-Vis. Image Signal Process.*, vol. 146, No. 6, pp. 339-344 (1999).

Reader, "History of MPEG Video Compression—Ver. 4.0," 99 pp., document marked Dec. 16, 2003.

Ribas-Corbera et al., "On the Optimal Motion Vector Accuracy for Block-Based Motion-Compensated Video Coders," *Proc. SPIE Dig. Video Compr.*, pp. 302-314 (1996).

Schultz et al., "Subpixel Motion Estimation for Super-Resolution Image Sequence Enhancement," *Journal of Visual Communication and Image Representation*, vol. 9, No. 1, pp. 38-50 (Mar. 1998).

Weiss et al., "Real Time Implementation of Subpixel Motion Estimation for Broadcast Applications," pp. 7/1-7/3 (1990).

ISO/IEC 11172-2, "Coding of Moving Pictures and Associated Audio for Digital Storage Media at Up to About 1.5 Mbit/s, Part 2: Video," pp. i-ii, 21-22, 27-30, 34-37, 43, 51-107 (1993).

ISO/IEC 14496-2, "Coding of Audio-Visual Objects: Visual, ISO/IEC 14496-2," pp. i-v, 159-184 (1998).

ITU-T Recommendation H.261, "Line of Transmission of Non-Telephone Signals," International Telecommunication Union, pp. i, 1-25 (Mar. 1993).

ITU-T Recommendation H.262, "Transmission of Non-Telephone Signals," International Telecommunication Union, pp. i-ii, 73-86 (Jul. 1995).

ITU-T Recommendation H.263, "Series H: Audiovisual and Multimedia Systems, Infrastructure of Audiovisual Services—Coding of Moving Video," International Telecommunication Union, pp. i-x, 4, 11-12, 15-16, 23-26, 38-40, 44-46, 53-56, 64-68, 80-84, 113-142 (Feb. 1998).

Borman et al., "Block-matching Sub-pixel Motion Estimation from Noisy, Under-Sampled Frames—an Empirical Performance Evaluation," SPIE Visual Communications and Image Processing, 10 pp. (1999).

Conklin et al., "Multi-resolution Motion Estimation," Proc. ICASSP '97, Munich, Germany, 4 pp. (1997).

Iwahashi et al., "A Motion Compensation Technique for Downscaled Pictures in Layered Coding," *IEICE Transactions on Comm.*, vol. E77-B, No. 8, pp. 1007-1012 (Aug. 1994).

Morimoto et al., "Fast Electronic Digital Image Stabilization," Proc. ICPR, Vienna, Austria, 5 pp. (1996).

Ribas-Corbera et al., "On the Optimal Block Size for Block-based Motion-Compensated Video Coders," SPIE Proc. of Visual Communications and Image Processing, vol. 3024, 12 pp. (1997).

Ribas-Corbera et al., "On the Optimal Motion Vector Accuracy for Block-based Motion-Compensated Video Coders," Proc. SPIE Digital Video Compression, San Jose, CA, 13 pp. (1996).

Triggs, "Empirical Filter Estimation for Subpixel Interpolation and Matching," Int'l Conf. Computer Vision '01, Vancouver, Canada, Jul. 9-12, 2001, 8 pp. (2001).

Triggs, "Optimal Filters for Subpixel Interpolation and Matching," Int'l Conf. Computer Vision '01, Vancouver, Canada, Jul. 9-12, 2001, 10 pp. (2001).

"Video Coding Using Wavelet Decomposition for Very Low Bit-rate Networks," 16 pp. (1997).

Yang et al., "Very High Efficiency VLSI Chip-pair for Full Search Block Matching with Fractional Precision," Proc. ICASSP, IEEE Int'l Conf. on Accoustics, Speech and Signal Processing, Glasgow, pp. 2437-2440 (May 1989).

* cited by examiner

Reference Frame    Predicted Frame

- a, b, c,..., p denote integer-pixel locations.
- $H_0$, $H_1$, $H_2$ denote half-pixel locations.

Software 380 implementing sub-pixel interpolation techniques

- Each circle denotes a pixel location in quarter-pixel intervals
- a . . . p denote integer-pixel locations
- $P_0$ . . . $P_8$ denote exemplary sub-pixel locations

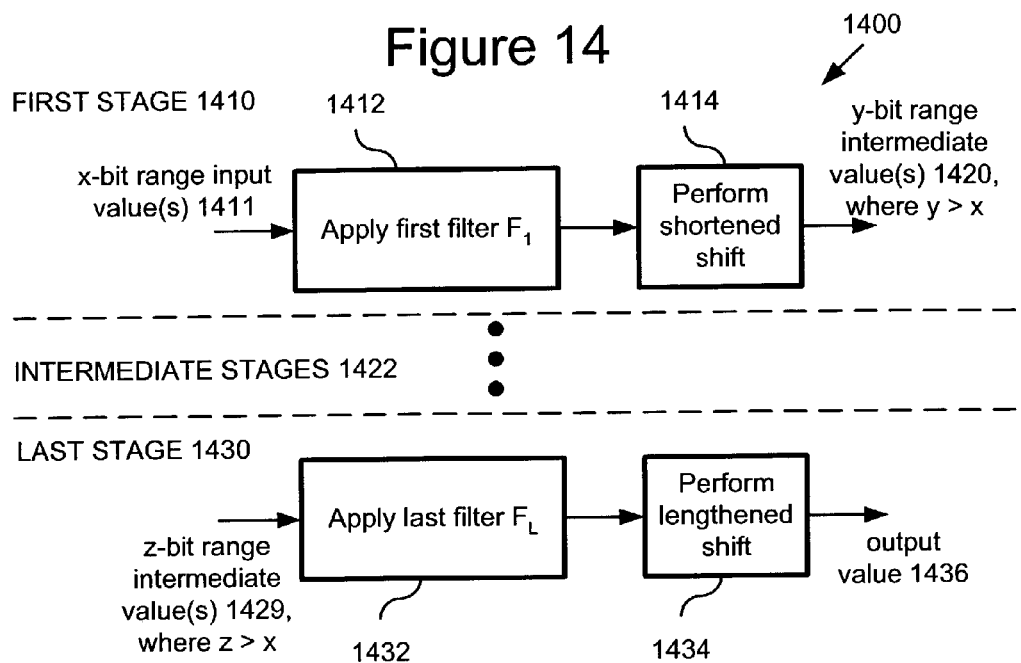
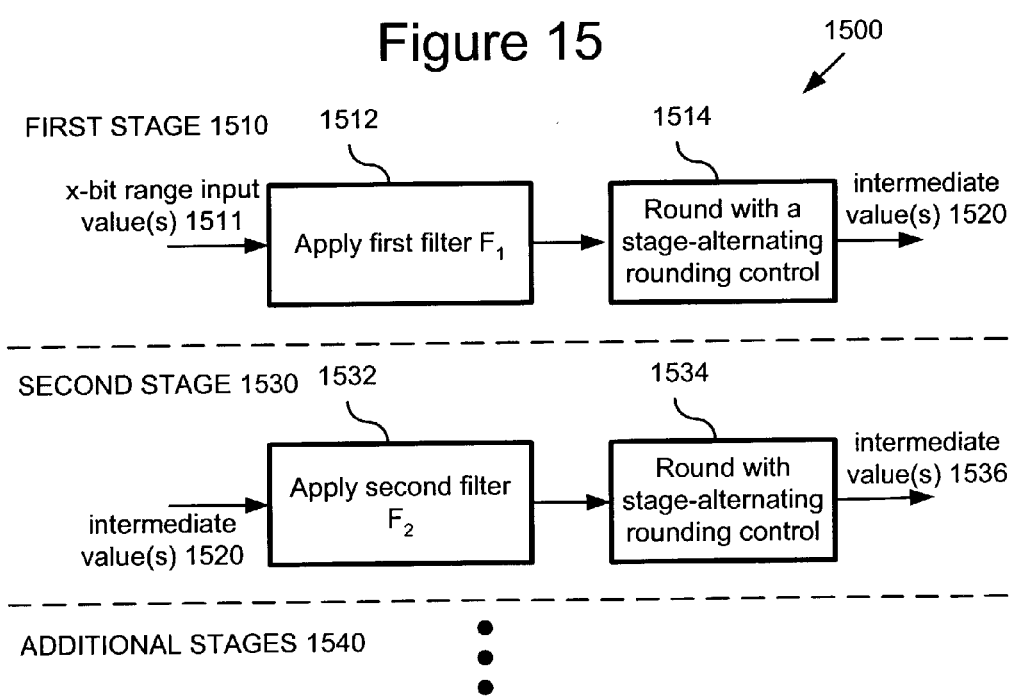

APPROXIMATE BICUBIC FILTER

CROSS REFERENCES TO RELATED APPLICATIONS

The present application claims the benefit of U.S. Provisional Patent Application Ser. No. 60/371,860, filed Apr. 10, 2002, the disclosure of which is incorporated herein by reference. The present application relates to U.S. patent application Ser. No. 10/382,311, entitled "SUB-PIXEL INTERPOLATION IN MOTION ESTIMATION AND COMPENSATION," filed concurrently herewith, U.S. patent application Ser. No. 10/382,294, entitled "ROUNDING CONTROL FOR MULTI-STAGE INTERPOLATION," filed concurrently herewith, and U.S. patent application Ser. No. 10/379,615, entitled "CHROMINANCE MOTION VECTOR ROUNDING," filed concurrently herewith, the disclosures of which are incorporated herein by reference.

TECHNICAL FIELD

Techniques and tools for approximate bicubic filtering are described. For example, a video encoder or decoder uses an approximate bicubic filter when computing pixel values at quarter-pixel positions in reference video frames.

BACKGROUND

Digital video consumes large amounts of storage and transmission capacity. A typical raw digital video sequence includes 15 or 30 frames per second. Each frame can include tens or hundreds of thousands of pixels (also called pels). Each pixel represents a tiny element of the picture. In raw form, a computer commonly represents a pixel with 24 bits. For instance, a pixel may comprise an 8-bit luminance value (also called a luma value) that defines the grayscale component of the pixel and two 8-bit chrominance values (also called chroma values) that define the color component of the pixel. Thus, the number of bits per second, or bit rate, of a typical raw digital video sequence may be 5 million bits per second or more.

Many computers and computer networks lack the resources to process raw digital video. For this reason, engineers use compression (also called coding or encoding) to reduce the bit rate of digital video. Compression can be lossless, in which quality of the video does not suffer, but decreases in the bit rate are limited by the complexity of the video. Or, compression can be lossy, in which quality of the video suffers, but decreases in the bit rate are more dramatic. Decompression reverses compression.

In general, video compression techniques include interframe compression and interframe compression. Interframe compression techniques compress individual frames, typically called I-frames or key frames. Interframe compression techniques compress frames with reference to preceding and/or following frames, which are typically called predicted frames, P-frames, or B-frames.

Microsoft Corporation's Windows Media Video, Version 8 ("WMV8") includes a video encoder and a video decoder. The WMV8 encoder uses interframe and interframe compression, and the WMV8 decoder uses interframe and interframe decompression. Interframe compression in the WMV8 encoder uses block-based motion compensated prediction coding followed by transform coding of the residual error.

In WMV8, a frame is represented as three pixel planes: a luminance (Y) plane of luminance pixel values and two chrominance (U, V) planes of chrominance pixel values. The resolution of the Y plane is double the resolution of the U and V planes horizontally and vertically. So, a 320 pixel× 240 pixel frame has a 320 pixel×240 pixel Y plane and 160 pixel×120 pixel U and V planes.

The WMV8 encoder splits a predicted frame into 8×8 blocks of pixels. Groups of four 8×8 luminance blocks and two co-located 8×8 chrominance blocks (one for the U chrominance plane, and one for the V chrominance plane) form 16×16 macroblocks. Thus, each 16×16 macroblock includes four 8×8 luminance blocks and two 8×8 chrominance blocks.

For a macroblock of a predicted frame, the WMV8 encoder performs motion estimation. The motion estimation approximates the motion of a macroblock in a predicted frame by searching for and matching the macroblock in the predicted frame with a macroblock from a reference frame. In FIG. 1, for instance, the WMV8 encoder computes a motion vector for a macroblock (115) in the predicted frame (110). To compute the motion vector, the encoder searches in a search area (135) of a reference frame (130). Within the search area (135), the encoder compares the luminance values of the macroblock (115) from the predicted frame (110) to the luminance values of various candidate blocks from the reference frame (130) in order to find a good match. The WMV8 encoder may switch motion vector accuracy, and may use a search range and motion vectors with integer, half, or quarter-pixel horizontal resolution and integer or half-pixel vertical resolution. With sub-pixel accurate motion vectors, the WMV8 encoder can approximate sub-pixel motion in a video sequence.

During motion compensation, the WMV8 encoder uses the motion vectors for macroblocks of the predicted frame to determine the predictors for the macroblocks from the reference frame. For each of the motion-predicted macroblocks, the WMV8 encoder computes the difference (called the residual or error) between the original macroblock and its predictor. The WMV8 encoder splits the residual into blocks and lossy compresses the residual blocks. To reconstruct the motion-predicted macroblocks of the predicted frame, the WMV8 encoder decompresses the residuals and adds them to the predictors for the respective macroblocks.

The WMV8 decoder also uses the motion vectors for macroblocks of the predicted frame to determine the predictors for the macroblocks from the reference frame. To reconstruct the motion-predicted macroblocks of the predicted frame, the WMV8 decoder decompresses the residuals and adds them to the predictors for the macroblocks.

During motion estimation or compensation, when a motion vector has sub-pixel accuracy (i.e., half-pixel or quarter-pixel), the WMV8 encoder or decoder must determine pixel values at sub-pixel positions in the reference frame. The WMV8 encoder or decoder generates values for sub-pixel positions using interpolation filters. FIG. 2 shows sub-pixel sample positions $H_0$, $H_1$, $H_2$, which have values computed by interpolation of integer-pixel values a, b, c, . . . , p.

When operating with half-pixel motion vector accuracy, the interpolation filters used for luminance pixel values at the three distinct half-pixel positions $H_0$, $H_1$, $H_2$ are:

$$H_0 = (f + g + R_2) >> 1 \quad (1),$$

$$H_1 = (f + j + R_2) >> 1 \quad (2), \text{ and}$$

$$H_2 = (f + g + j + k + R_1) >> 2 \quad (3),$$

where $R_1$ and $R_2$ are rounding control values that are controlled by a one-bit rounding-control flag that indicates the rounding mode for a particular frame. If the rounding-control flag is set to 0, then $R_1=2$ and $R_2=1$. If the rounding-control flag is set to 1, then $R_1=R_2=0$. The value of the rounding-control flag alternates between 1 and 0 for each P-frame. At each I frame, the value of the rounding-control flag is reset to 0. Thus, the rounding control operates on a frame-by-frame basis.

Equations 1, 2, and 3 are examples of bilinear interpolation. Bilinear interpolation is fast and tends to smooth pixel values. The smoothing may have desirable effects (such as decreasing perceptibility of quantization noise), but it can also lead to loss of valid pixel information.

For quarter-pixel motion vector resolution, the WMV8 encoder or decoder first employs bicubic filters to interpolate luminance pixel values at half-pixel positions. Bicubic interpolation is slower than bilinear interpolation, but tends to preserve edge values and result in less loss of valid pixel information. The bicubic filters for the three distinct half-pixel positions $H_0$, $H_1$, $H_2$ are:

$$H_0=(-e+9f+9g-h+8)>>4 \quad (4),$$

$$H_1=(-b+9f+9j-n+8)>>4 \quad (5), \text{ and}$$

$$H_2=(-t_0+9t_1+9t_2-t_3+8)>>4 \quad (6),$$

where $t_0$, $t_1$, $t_2$, $t_3$ are computed as follows:

$$t_0=(-a+9b+9c-d+8)>>4 \quad (7),$$

$$t_1=(-e+9f+9g-h+8)>>4 \quad (8),$$

$$t_2=(-i+9j+9k-l+8)>>4 \quad (9), \text{ and}$$

$$t_3=(-m+9n+9o-p+8)>>4 \quad (10).$$

Equations (4)–(10) can result in output outside of the range of input values. For example, for 8-bit input (range 0 . . . 255), the series of values 0 255 255 0 produces an output value of 287 in any of equations (4)–(10). So, the WMV8 encoder or decoder clamps (or, "clips") the output value of any of equations (4)–(10) to be within the valid range. For example, for 8-bit output values, values less than 0 are changed to 0, and values greater than 255 are changed to 255. Clamping addresses the range problem, but slows down computation. In addition, clamping results in loss of precision.

The WMV8 encoder or decoder then computes pixel values at certain quarter-pixel positions in a subsequent stage of interpolation. These quarter-pixel locations are situated horizontally in between either two half-pixel locations or an integer-pixel location and a half-pixel location. For these quarter-pixel locations, the WMV8 encoder or decoder uses bilinear interpolation (i.e., (x+y+1)>>1) using the two horizontally neighboring half-pixel/integer-pixel locations without rounding control.

Once luminance motion vectors are computed, the WMV8 encoder or decoder derives co-located chrominance motion vectors. Because a chrominance plane in WMV8 is half as large as a luminance plane both horizontally and vertically, luminance motion vector values must be scaled into appropriate chrominance motion vector values. In WMV8, this conversion process includes halving the luminance motion vectors and rounding the resulting chrominance motion vectors to half-pixel accuracy. Thus, luminance motion vectors having half-pixel accuracy are not converted to chrominance motion vectors having quarter-pixel accuracy. Moreover, chrominance rounding in WMV8 operates in a single mode that cannot be modified or selected by the user.

In WMV8, the pixel values at sub-pixel positions in a reference frame may exhibit underflow or overflow in some circumstances. For example, the luminance pixel value at a quarter-pixel position may be 271 (which is outside the range of 0 . . . 255) if the neighboring integer-pixel position value is 255 and the neighboring half-pixel position value is 287 (0+9*255+9*255−0+8>>4=287) (255+287+1>>1= 271). To address this problem, after adding the residual blocks to the predictor for a macroblock, the WMV8 encoder and decoder clamp reconstructed values for the macroblock to be within the range of 0 . . . 255, if necessary.

Aside from WMV8, several international standards relate to video compression and decompression. These standards include the Motion Picture Experts Group ["MPEG"] 1, 2, and 4 standards and the H.261, H.262, and H.263 standards from the International Telecommunication Union ["ITU"]. Like WMV8, these standards use a combination of intraframe and interframe compression, although the standards typically differ from WMV8 in the details of the compression techniques used.

Several standards (e.g., MPEG 4 and H.263) provide for half-pixel motion estimation and compensation using bilinear filters and basic rounding control. Moreover, in H.263, chrominance motion vectors which theoretically have quarter-pixel resolution (i.e., one half of the resolution of the half-pixel luminance motion vectors) are rounded to either half-pixel or full-pixel accuracy so that no quarter-pixel values are allowed in chrominance space. For additional detail about motion estimation/compensation in the standards, see the standards' specifications themselves.

Motion estimation and compensation are effective compression techniques, but the various previous motion estimation/compensation techniques (as in WMV8 and the standards discussed above) have several disadvantages, including:

(1) When computing pixel values at sub-pixel positions in reference frames, the encoders and decoders unnecessarily lose precision in intermediate values. For instance, when computing the pixel value for a quarter-pixel position in WMV8, the intermediate values at half-pixel positions are right-shifted by four bits despite the fact that a greater bit depth might be available. Further, the WMV8 encoder/decoder clamps intermediate values during the two-stage interpolation of quarter-pixel positions, which slows down computation and results in the unnecessary loss of precision.

(2) Interpolation for pixel values in quarter-pixel motion estimation and compensation is inefficient in many cases. For example, in WMV8, the calculation of a one-dimensional quarter-pixel position requires the use of a filter for a half-pixel position followed by use of a bilinear filter.

(3) The encoders and decoders fail to account for the accumulation of rounding error that might be created in multi-stage interpolation. Rounding error occurs, for example, when pixel values are repeatedly rounded down from frame to frame in a video sequence. This rounding error can cause perceptible artifacts in low-quality, low-bitrate video sequences. For instance, when the WMV8 encoder and decoder interpolate for a pixel value at a quarter-pixel position in multiple stages, rounding control is not used. Instead, the results of each stage are rounded in the same fashion in each stage of interpolation (and without rounding control); and (4) Chrominance rounding is not performed to quarter-pixel accuracy, and no control is given over chrominance motion vector rounding options. For example, the WMV8 encoder and decoder round all chrominance motion vectors to a half-pixel value and operate in only a single mode.

Given the critical importance of motion estimation and compensation to digital video, it is not surprising that motion estimation and compensation are richly developed fields. Whatever the benefits of previous motion estimation and compensation techniques, however, they do not have the advantages of the following techniques and tools.

SUMMARY

In summary, the detailed description is directed to various techniques and tools for approximate bicubic filtering. In video coding and decoding applications, for example, a video encoder and decoder use one or more approximate bicubic filters when computing pixel values at sub-pixel positions in reference video frames. This improves the effectiveness of motion prediction using the computed pixel values. At the same time, the approximate bicubic filtering is relatively efficient computationally.

A component such as a video encoder or decoder computes a value at a position using an approximate bicubic filter. The approximate bicubic filter performs substantially like a bicubic filter, which is desirable, but has different filter coefficients and/or lower resolution to simplify computation. For example, the filter coefficients of the approximate bicubic filter have a sum of 64 (rather than 128) for a lower-resolution filter for quarter-sample positions.

A video encoder or decoder may compute pixel values at various sub-pixel positions in reference video frames using an approximate bicubic filter. The sub-pixel positions are, for example, quarter-pixel (or three-quarters-pixel) shifted positions in one dimension or two dimensions.

The various techniques and tools can be used in combination or independently. Additional features and advantages will be made apparent from the following detailed description that proceeds with reference to the accompanying drawings.

BRIEF DESCRIPTION OF THE DRAWINGS

FIG. 14 is a diagram showing a multi-stage interpolation technique with deferred bit shifting.

FIG. 15 is a diagram showing a multi-stage interpolation technique using stage-alternating rounding control.

DETAILED DESCRIPTION

Described embodiments relate to techniques and tools for sub-pixel interpolation in motion estimation and compensation. Various embodiments relate to techniques and tools for retaining precision in multi-stage interpolation by deferring clamping and/or bit shifting (operations which can result in loss of precision) until later stages in the interpolation. Other embodiments relate to efficient filters or rounding operations for multi-stage interpolation.

An encoder or decoder performs sub-pixel interpolation on a reference frame or on a portion of a frame such as one or more blocks or macroblocks. The encoder/decoder computes pixel values at sub-pixel locations within the reference frame. The encoder/decoder may then perform motion compensation using sub-pixel accurate motion vectors.

In some embodiments, a video encoder or video decoder performs the sub-pixel interpolation in a video coding or decoding application. Alternatively, another encoder or decoder, or another type of component, performs the sub-pixel interpolation or other technique described below in another type of application.

As an alternative to performing sub-pixel interpolation on reference frames, in some embodiments, an encoder/decoder performs sub-pixel interpolation on fields, object layers, or other images.

In some embodiments, sub-pixel interpolation occurs by computing pixel values in the luminance and chrominance planes of a reference frame in YUV color space. Alternatively, the color space is different (e.g., YIQ or RGB).

The various techniques and tools can be used in combination or independently. Different embodiments implement one or more of the described techniques and tools. Although the operations for these techniques are typically described in a particular, sequential order for the sake of presentation, it should be understood that this manner of description encompasses minor rearrangements in the order of operations, unless a particular ordering is required. For example, operations described sequentially may in some cases be rearranged or performed concurrently. Moreover, for the sake of simplicity, flowcharts typically do not show the various ways in which particular techniques can be used in conjunction with other techniques.

In some embodiments, a video encoder and decoder use various flags and signals in a bitstream. While specific flags and signals are described, it should be understood that this manner of description encompasses different conventions (e.g., 0's rather than 1's) for the flags and signals.

I. Computing Environment

Figure 1:
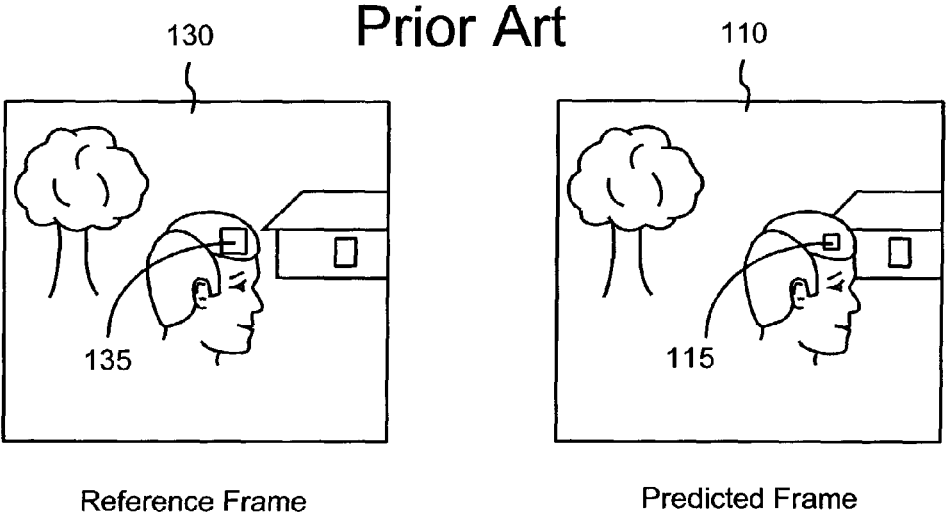
FIG. 1 is a diagram showing motion estimation in a video encoder according to the prior art.
Figure 2:
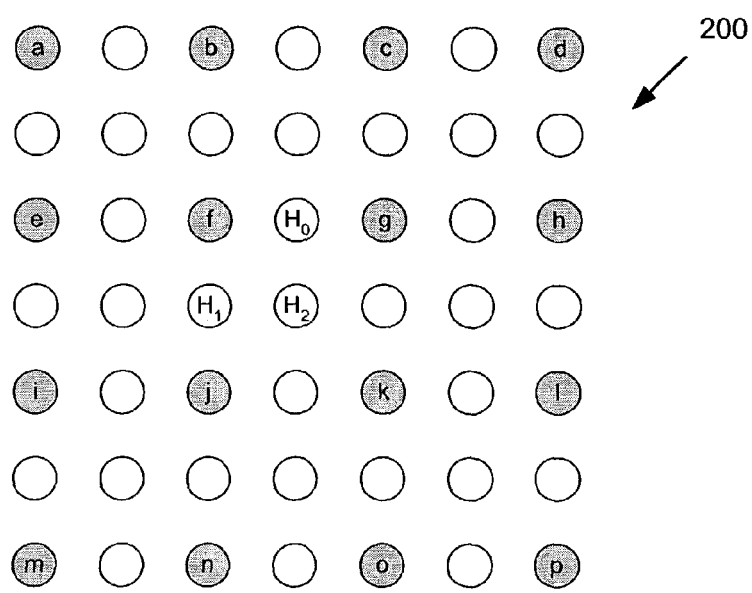
FIG. 2 is a chart showing sub-pixel locations for interpolation in sub-pixel motion estimation and compensation according to the prior art.
Figure 3:
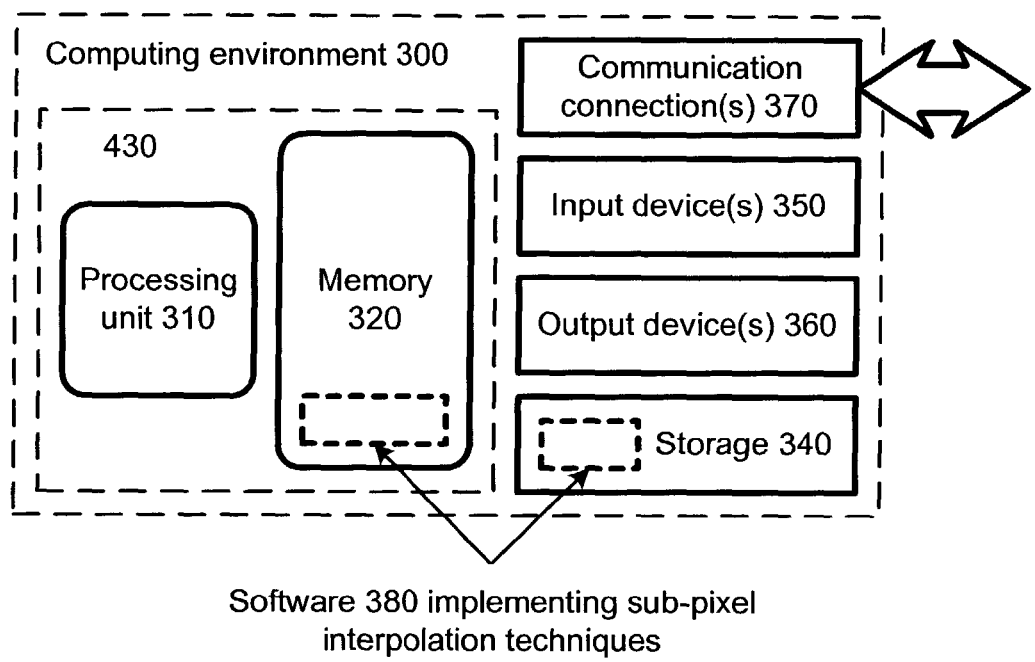
FIG. 3 is a block diagram of a suitable computing environment in which several described embodiments may be implemented.

FIG. 3 illustrates a generalized example of a suitable computing environment (300) in which several of the described embodiments may be implemented. The computing environment (300) is not intended to suggest any limitation as to scope of use or functionality, as the techniques and tools may be implemented in diverse general-purpose or special-purpose computing environments.

With reference to FIG. 3, the computing environment (300) includes at least one processing unit (310) and memory (320). In FIG. 3, this most basic configuration (330) is included within a dashed line. The processing unit (310) executes computer-executable instructions and may be a real or a virtual processor. In a multi-processing system, multiple processing units execute computer-executable instructions to increase processing power. The memory (320) may be volatile memory (e.g., registers, cache, RAM), non-volatile memory (e.g., ROM, EEPROM, flash memory, etc.), or some combination of the two. The memory (320) stores software (380) implementing sub-pixel interpolation techniques in an encoder and/or decoder, such as a video encoder and/or decoder.

A computing environment may have additional features. For example, the computing environment (300) includes storage (340), one or more input devices (350), one or more output devices (360), and one or more communication connections (370). An interconnection mechanism (not shown) such as a bus, controller, or network interconnects the components of the computing environment (300). Typically, operating system software (not shown) provides an operating environment for other software executing in the computing environment (300), and coordinates activities of the components of the computing environment (300).

The storage (340) may be removable or non-removable, and includes magnetic disks, magnetic tapes or cassettes, CD-ROMs, DVDs, or any other medium which can be used to store information and which can be accessed within the computing environment (300). The storage (340) stores instructions for the software (380) implementing sub-pixel interpolation techniques.

The input device(s) (350) may be a touch input device such as a keyboard, mouse, pen, or trackball, a voice input device, a scanning device, or another device that provides input to the computing environment (300). For audio or video encoding, the input device(s) (350) may be a sound card, video card, TV tuner card, or similar device that accepts audio or video input in analog or digital form, or a CD-ROM or CD-RW that reads audio or video samples into the computing environment (300). The output device(s) (360) may be a display, printer, speaker, CD-writer, or another device that provides output from the computing environment (300).

The communication connection(s) (370) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (300), computer-readable media include memory (320), storage (340), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine" and "select" to describe computer operations in a computing environment. These terms are high-level abstractions for operations performed by a computer and should not be confused with acts performed by a human being. The actual computer operations corresponding to these terms vary depending on implementation.

II. Generalized Video Encoder and Decoder

Figure 4:
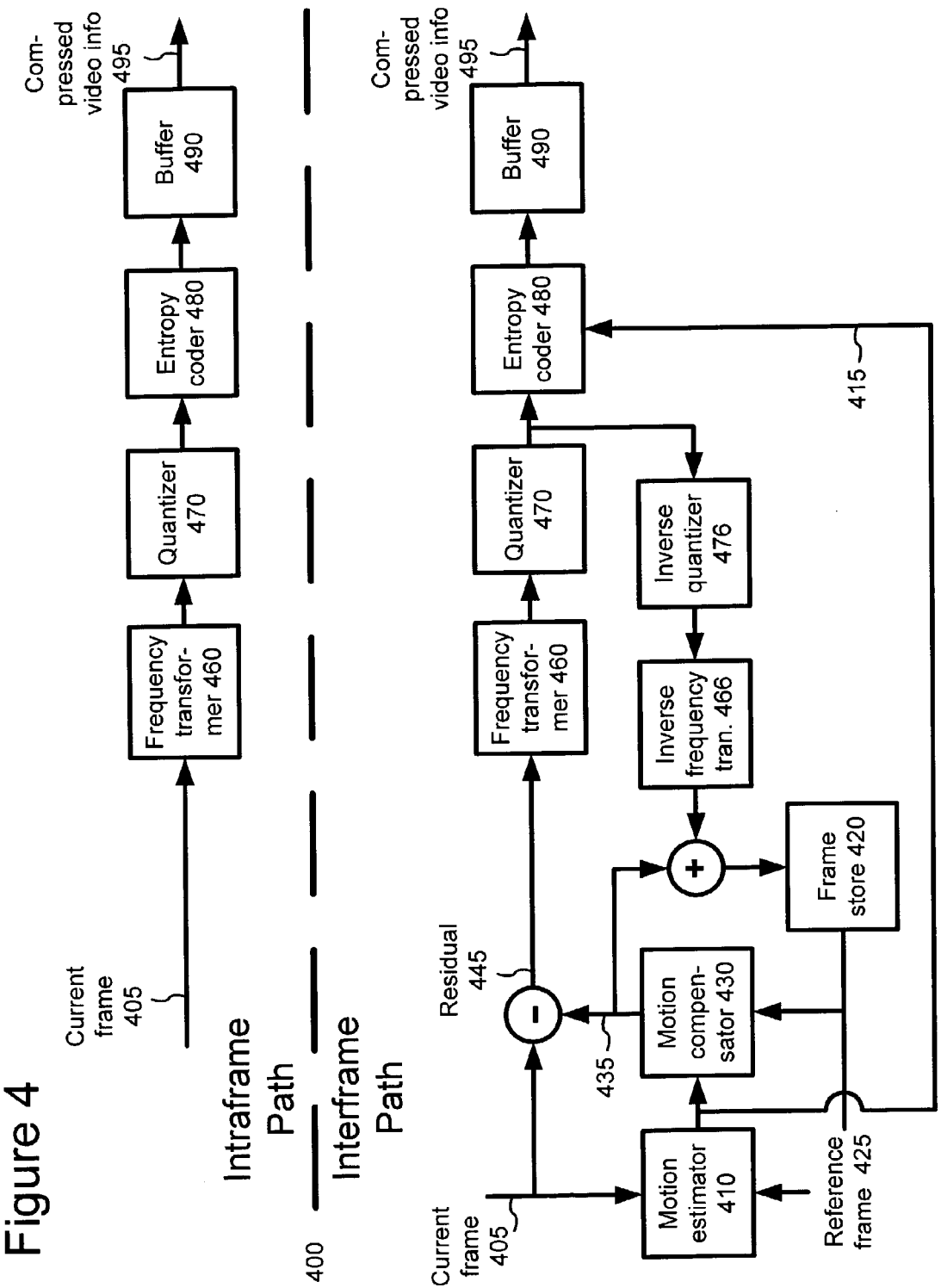
FIG. 4 is a block diagram of a generalized video encoder system used in several described embodiments.
Figure 5:
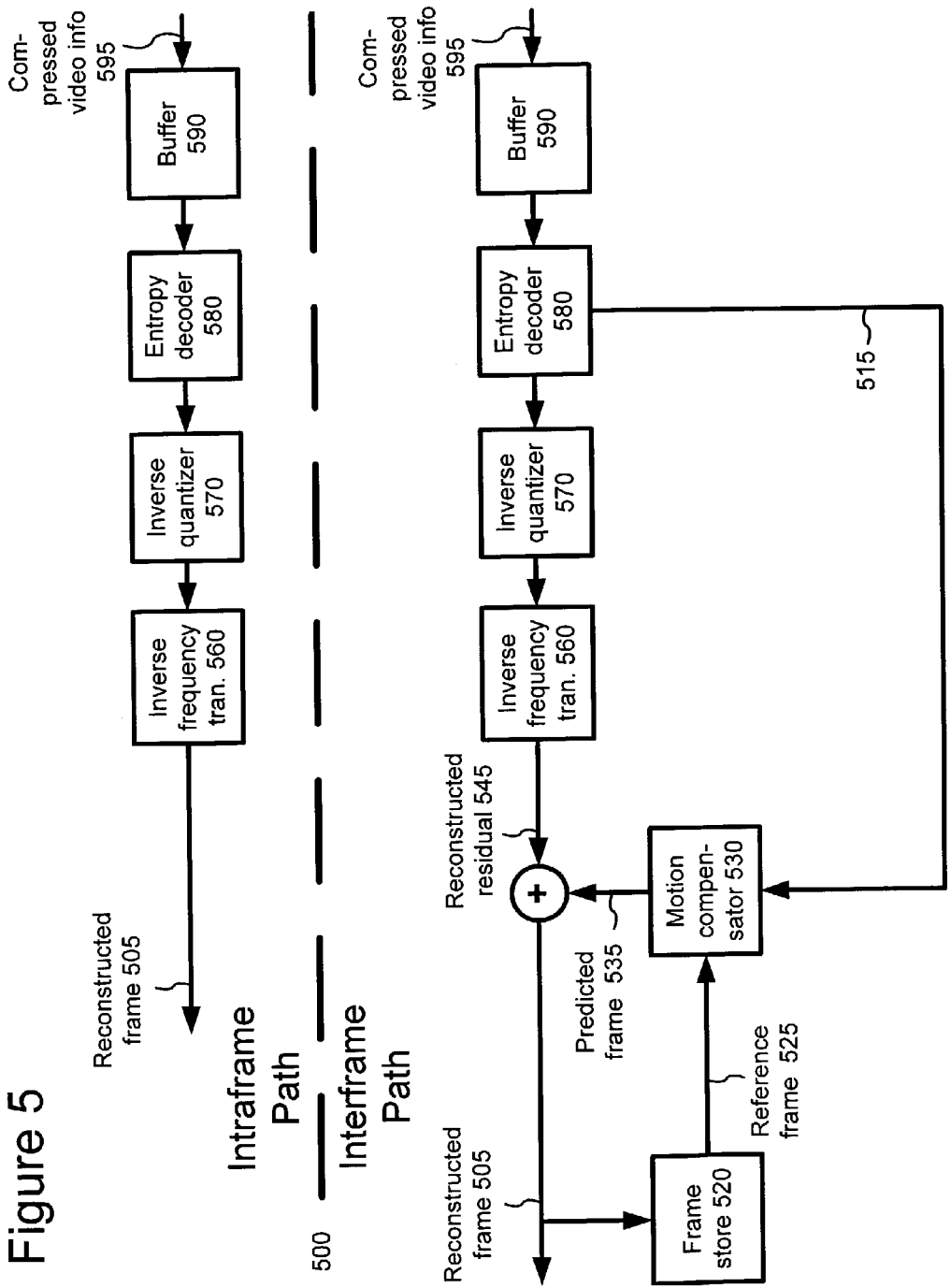
FIG. 5 is a block diagram of a generalized video decoder system used in several described embodiments.

FIG. 4 is a block diagram of a generalized video encoder (400) and FIG. 5 is a block diagram of a generalized video decoder (500).

The relationships shown between modules within the encoder and decoder indicate the main flow of information in the encoder and decoder; other relationships are not shown for the sake of simplicity. In particular, FIGS. 4 and 5 usually do not show side information indicating the encoder settings, modes, tables, etc. used for a video sequence, frame, macroblock, block, etc. Such side information is sent in the output bitstream, typically after entropy encoding of the side information. The format of the output bitstream can be a Windows Media Video format or another format.

The encoder (400) and decoder (500) are block-based and use a 4:2:0 macroblock format with each macroblock including 4 luminance 8×8 luminance blocks (at times treated as one 16×16 macroblock) and two 8×8 chrominance blocks (e.g., one U block, one V block). Alternatively, the encoder (400) and decoder (500) are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoder or decoders with different modules and/or other configurations of modules perform one or more of the described techniques.

A. Video Encoder

FIG. 4 is a block diagram of a general video encoder system (400). The encoder system (400) receives a sequence of video frames including a current frame (405), and produces compressed video information (495) as output. Particular embodiments of video encoders typically use a variation or supplemented version of the generalized encoder (400).

The encoder system (400) compresses predicted frames and key frames. For the sake of presentation, FIG. 4 shows a path for key frames through the encoder system (400) and a path for forward-predicted frames. Many of the components of the encoder system (400) are used for compressing both key frames and predicted frames. The exact operations performed by those components can vary depending on the type of information being compressed.

A predicted frame [also called p-frame, b-frame for bi-directional prediction, or inter-coded frame] is represented in terms of prediction (or difference) from one or more other frames. A prediction residual is the difference between what was predicted and the original frame. In contrast, a key frame [also called i-frame, intra-coded frame] is compressed without reference to other frames.

If the current frame (405) is a forward-predicted frame, a motion estimator (410) estimates motion of macroblocks or other sets of pixels of the current frame (405) with respect to a reference frame, which is the reconstructed previous frame (425) buffered in the frame store (420). In alternative embodiments, the reference frame is a later frame or the current frame is bi-directionally predicted. The motion estimator (410) outputs as side information motion information (415) such as motion vectors. A motion compensator (430) applies the motion information (415) to the reconstructed previous frame (425) to form a motion-compensated current frame (435). The prediction is rarely perfect, however, and the difference between the motion-compensated current frame (435) and the original current frame (405) is the prediction residual (445). Alternatively, a motion estimator and motion compensator apply another type of motion estimation/compensation.

A frequency transformer (460) converts the spatial domain video information into frequency domain (i.e., spectral) data. For block-based video frames, the frequency transformer (460) applies a discrete cosine transform ["DCT"] or variant of DCT to blocks of the motion prediction residual data, producing blocks of DCT coefficients. Alternatively, the frequency transformer (460) applies another conventional frequency transform such as a Fourier transform or uses wavelet or subband analysis. In some embodiments, the frequency transformer (460) applies a frequency transform to blocks of spatial prediction residuals for key frames. The frequency transformer (460) can apply an 8×8, 8×4, 4×8, or other size frequency transforms.

A quantizer (470) then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (400) can use frame dropping, adaptive filtering, or other techniques for rate control.

When a reconstructed current frame is needed for subsequent motion estimation/compensation, an inverse quantizer (476) performs inverse quantization on the quantized spectral data coefficients. An inverse frequency transformer (466) then performs the inverse of the operations of the frequency transformer (460), producing a reconstructed prediction. residual (for a predicted frame) or a reconstructed key frame. If the current frame (405) was a key frame, the reconstructed key frame is taken as the reconstructed current frame (not shown). If the current frame (405) was a predicted frame, the reconstructed prediction residual is added to the motion-compensated current frame (435) to form the reconstructed current frame. The frame store (420) buffers the reconstructed current frame for use in predicting the next frame. In some embodiments, the encoder applies a deblocking filter to the reconstructed frame to adaptively smooth discontinuities in the blocks of the frame.

The entropy coder (480) compresses the output of the quantizer (470) as well as certain side information (e.g., motion information (415), quantization step size). Typical entropy coding techniques include arithmetic coding, differential coding, Huffman coding, run length coding, LZ coding, dictionary coding, and combinations of the above. The entropy coder (480) typically uses different coding techniques for different kinds of information (e.g., DC coefficients, AC coefficients, different kinds of side information), and can choose from among multiple code tables within a particular coding technique.

The entropy coder (480) puts compressed video information (495) in the buffer (490). A buffer level indicator is fed back to bitrate adaptive modules. The compressed video information (495) is depleted from the buffer (490) at a constant or relatively constant bitrate and stored for subsequent streaming at that bitrate. Alternatively, the encoder system (400) streams compressed video information immediately following compression.

Before or after the buffer (490), the compressed video information (495) can be channel coded for transmission over the network. The channel coding can apply error detection and correction data to the compressed video information (495).

B. Video Decoder

FIG. 5 is a block diagram of a general video decoder system (500). The decoder system (500) receives information (595) for a compressed sequence of video frames and produces output including a reconstructed frame (505). Particular embodiments of video decoders typically use a variation or supplemented version of the generalized decoder (500).

The decoder system (500) decompresses predicted frames and key frames. For the sake of presentation, FIG. 5 shows a path for key frames through the decoder system (500) and a path for forward-predicted frames. Many of the components of the decoder system (500) are used for decompressing both key frames and predicted frames. The exact operations performed by those components can vary depending on the type of information being compressed.

A buffer (590) receives the information (595) for the compressed video sequence and makes the received information available to the entropy decoder (580). The buffer (590) typically receives the information at a rate that is fairly constant over time, and includes a jitter buffer to smooth short-term variations in bandwidth or transmission. The buffer (590) can include a playback buffer and other buffers as well. Alternatively, the buffer (590) receives information at a varying rate. Before or after the buffer (590), the compressed video information can be channel decoded and processed for error detection and correction.

The entropy decoder (580) entropy decodes entropy-coded quantized data as well as entropy-coded side information (e.g., motion information (515), quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (580) frequently uses different decoding techniques for different kinds of information (e.g., DC coefficients, AC coefficients, different kinds of side information), and can choose from among multiple code tables within a particular decoding technique.

If the frame (505) to be reconstructed is a forward-predicted frame, a motion compensator (530) applies motion information (515) to a reference frame (525) to form a prediction (535) of the frame (505) being reconstructed. For example, the motion compensator (530) uses a macroblock motion vector to find a macroblock in the reference frame (525). A frame buffer (520) stores previous reconstructed frames for use as reference frames. Alternatively, a motion compensator applies another type of motion compensation. The prediction by the motion compensator is rarely perfect, so the decoder (500) also reconstructs prediction residuals.

When the decoder needs a reconstructed frame for subsequent motion compensation, the frame store (520) buffers the reconstructed frame for use in predicting the next frame. In some embodiments, the encoder applies a deblocking filter to the reconstructed frame to adaptively smooth discontinuities in the blocks of the frame.

An inverse quantizer (570) inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive quantization, or directly inverse quantizes spatial domain data in a decoder system that does not use inverse frequency transformations.

An inverse frequency transformer (560) converts the quantized, frequency domain data into spatial domain video information. For block-based video frames, the inverse frequency transformer (560) applies an inverse DCT ["IDCT"] or variant of IDCT to blocks of the DCT coefficients, producing motion prediction residual data. Alternatively, the frequency transformer (560) applies another conventional inverse frequency transform such as a Fourier transform or uses wavelet or subband synthesis. In some embodiments, the inverse frequency transformer (560) applies an inverse frequency transform to blocks of spatial prediction residuals for key frames. The inverse frequency transformer (560) can apply an 8×8, 8×4, 4×8, or other size inverse frequency transforms.

III. Motion Estimation and Compensation

Inter-frame coding exploits temporal redundancies between frames to achieve compression. Temporal redundancy reductions use previously coded frames as predictors when coding the current frame. In the embodiments described below, a video encoder exploits temporal redundancies in typical video sequences in order to code the information using a smaller number of bits. The video encoder uses motion estimation to parameterize the motion of a block, a macroblock, or other set of pixels of a predicted frame relative to a reference frame (e.g., a previously coded, prior frame). The video encoder (as well as a corresponding decoder) use motion compensation to reconstruct the predicted frame using motion information and the reference frame.

Motion compensation is the process of generating a prediction for a video frame (i.e., the predicted frame) by displacing the reference frame. As noted above, the prediction is formed for a block, macroblock, or other set of data from the reference frame. Also, typically the displacement is rectilinear and constant over the entire tile being predicted. Such a displacement is defined by a motion vector with two components corresponding to the displacement or shift along the X and Y directions. The X (horizontal) and Y (vertical) motion vector components represent the displacement between the tile currently being predicted and the corresponding location in the reference frame. Positive values represent locations that are below and to the right of the current location. Negative values represent locations that are above and to the left of the current location.

In one implementation, a block is an 8×8 tile of pixels, a macroblock is a 16×16 tile of pixels, and motion vectors are defined to quarter-pixel accuracy. In other implementations, the encoder and decoder apply one or more of the described techniques to different size tiles or arbitrarily varying sized tiles, with different resolution or arbitrarily varying motion vectors, and/or using motion information other than motion vectors.

Motion vector components are usually specified in terms of pixel displacements, often with sub-pixel accuracy. Sub-pixel displacements are realized by filtering the reference frame using appropriately defined motion compensation filters. For the case of rectilinear sub-pixel motion compensation, the X and Y components are represented as fixed-point numbers. The integer part of these numbers is called the full-pixel shift, and the fractional part is called the sub-pixel shift. When the sub-pixel shift is zero, the motion is an integer number of pixels. Most often, this is implemented as a block copy from the reference frame to generate the predictor (although, in theory, some form of filtering could potentially be applied). On the other hand, when the sub-pixel shift is non-zero, the predictor is generated by applying one or more filters corresponding to the sub-pixel shift to integer-pixel locations in the reference frame. Therefore, the motion compensation filter is determined by the sub-pixel shift.

To implement sub-pixel shifts as filtering operations, motion compensation filters interpolate data points at fractional pixel locations based on reference values at integer-pixel locations. In general, the quality of interpolation increases with the support of the filter. Some embodiments use separable 2-tap and 4-tap (in each direction) filters, which correspond to bilinear and bicubic interpolators.

In some embodiments, the motion compensation filters use integer arithmetic and division implemented as a bit shift. The rounding control parameter R takes on the value of 0 or 1, and determines the direction of rounding for these divisions. This rounding control parameter may be set to a constant, signaled externally, or may be implicitly derived from past coded information.

Figure 6:
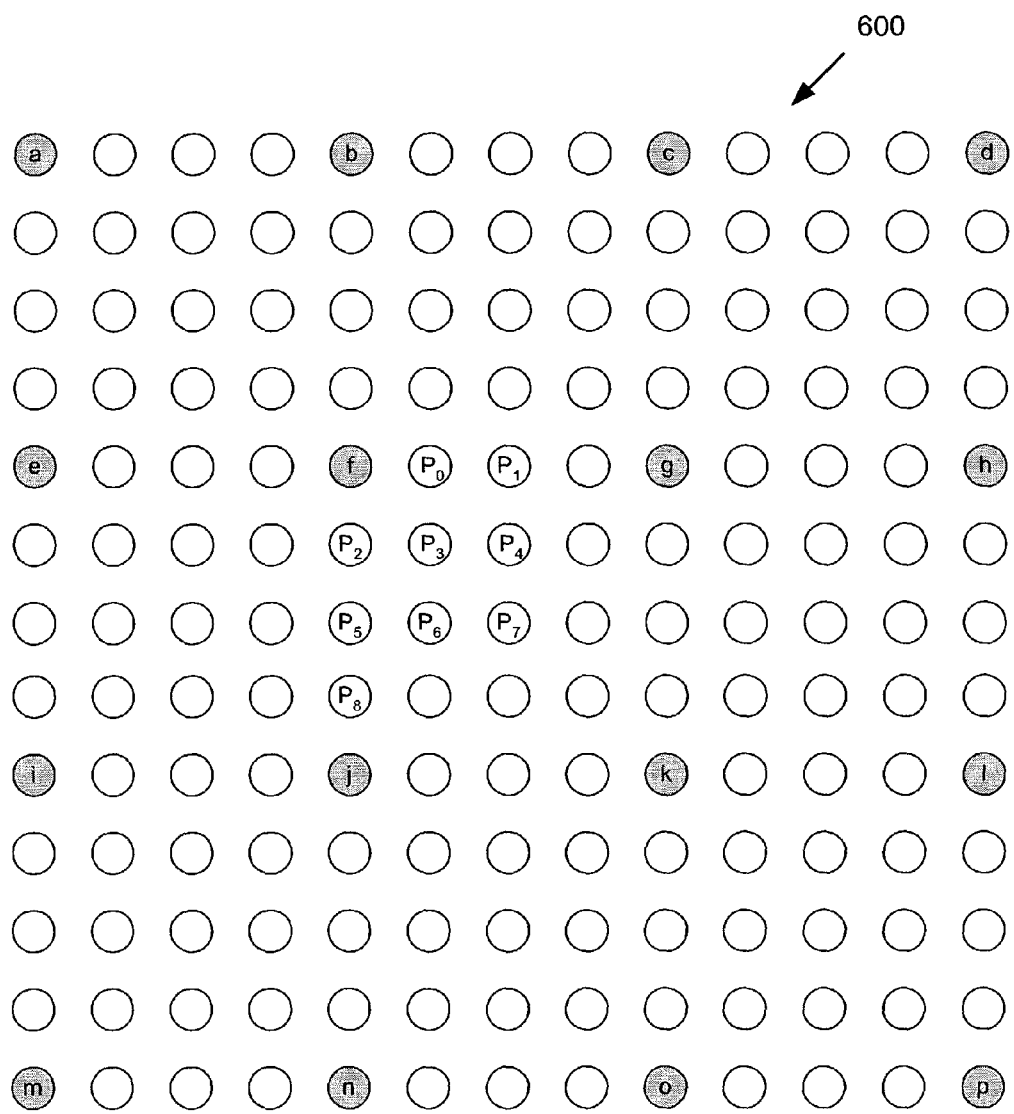
FIG. 6 is a chart showing locations for pixel value interpolation during sub-pixel motion estimation and compensation.

FIG. 6 shows integer-pixel and sub-pixel locations in a reference frame (600) used during sub-pixel motion estimation and compensation in some embodiments. At quarter-pixel intervals in each direction, the reference frame (600) includes sub-pixel locations for which an encoder or decoder may interpolate pixel values for a particular displacement. The integer positions a-p of the reference frame (600) are shown as shaded circles in FIG. 6, whereas the quarter-pixel and half-pixel positions interposed between the integer locations are shown as unshaded circles. Locations $P_0$ to $P_8$ show nine representative sub-pixel positions, as described in Table 1.

TABLE 1

Representative sub-pixel positions.

| Position | Description |
|---|---|
| $P_0$ | Quarter-pixel horizontal, full-pixel vertical. |
| $P_1$ | Half-pixel horizontal, full-pixel vertical. |
| $P_2$ | Full-pixel horizontal, quarter-pixel vertical. |
| $P_3$ | Quarter-pixel horizontal, quarter-pixel vertical. |
| $P_4$ | Half-pixel horizontal, quarter-pixel vertical. |
| $P_5$ | Full-pixel horizontal, half-pixel vertical. |
| $P_6$ | Quarter-pixel horizontal, half-pixel vertical. |
| $P_7$ | Half-pixel horizontal, half-pixel vertical. |
| $P_8$ | Full-pixel horizontal, three-quarter-pixel vertical. |

The three-quarter-pixel position exemplified at $P_8$ may be considered a special case of the quarter-pixel position; it is a quarter-pixel shift away from a full-pixel location. Other three-quarter-pixel positions are possible but not shown. The sub-pixel positions $P_0$ to $P_8$ are referenced in later descriptions of interpolation filters. In alternative embodiments, the encoder and decoder interpolate values at additional or different sub-pixel positions, for example, those at an interval other than quarter pixel in each direction.

A. Approximate Bicubic Interpolation Filters

For sub-pixel interpolation in some embodiments, a video encoder and decoder use linear/bilinear filters and/or cubic/bicubic filters that are defined as follows.

A linear interpolator is a linear, or first-order, polynomial in one dimension that utilizes known values at the two closest lattice points to the point being interpolated. The value of the linear function at the point being interpolated is the linear interpolation. The multipliers of the linear polynomial are calculated by solving a linear system of equations, determining the coefficients of the linear filter. A linear interpolator filter is defined by two filter taps. A bilinear interpolator is a linear interpolator separable in two dimensions.

A cubic interpolator is a cubic, or third-order, polynomial in one dimension that utilizes known values at the four closest lattice points to the point being interpolated. The value of the cubic function at the point being interpolated is the cubic interpolation. The multipliers of the cubic polynomial are calculated by solving a system of equations, determining the coefficients of the cubic filter. A cubic interpolator filter is defined by four filter taps. A bicubic interpolator is a cubic interpolator separable in two dimensions.

The terms linear and bilinear are typically used interchangeably in the fields of video compression and decompression. In a normal two-dimensional interpolation, an interpolation operation performed in one dimension is replicated in the other dimension, and therefore each filtering stage is termed bilinear filtering. The terms cubic and bicubic are similarly interchangeable.

In this document, the terms linear and bilinear are used interchangeably to describe filtering in one, two, or more dimensions. Similarly, the terms cubic and bicubic are used interchangeably to describe filtering in one, two, or more dimensions. For instance, equations (11) through (13) define types of cubic filters, but are referred to as bicubic filters because, in the common application of two-stage interpolation for reference video frames, the filters are used in operations replicated for both dimensions of the two-stage interpolation. More generally, the dimensionality of the filtering is known from the context.

In some embodiments, an encoder and decoder use approximate bicubic filters to interpolate values at sub-pixel locations. For example, the encoder and decoder use the following filters (of which $F_1$ is a bicubic filter, and $F_2$ and $F_3$ are approximate bicubic filters) at possible shift locations in a reference frame such as the one shown in FIG. 6.

$$\text{half-pixel shift } F_1:[-1\ 9\ 9\ -1] \qquad (11),$$

$$\text{quarter-pixel shift } F_2:[-4\ 53\ 18\ -3] \qquad (12), \text{ and}$$

$$\text{three-quarter-pixel shift } F_3:[-3\ 18\ 53\ -4] \qquad (13).$$

In practice, the filters also include a right shift (e.g., 4 bits for $F_1$, 6 bits for $F_2$ and $F_3$) to compensate for expansion potentially introduced by the filter coefficients. The operator >> is a right shift operator. A right shift operation shifts the bits of a binary number to the right, dropping the least significant bit and adding a 0 as the most significant bit. This operation results in a simple division by 2 to the power of the number of bits shifted (e.g., a right shift by 3 results in division by $2^3=8$) with the remainder dropped.

The filter coefficients for $F_2$ and $F_3$ are loosely based on the true quarter-pixel bicubic interpolator, which is a four-tap filter. The following equation shows the result of applying the true quarter-pixel bicubic filter for the location $P_0$:

$$(-7e+105f+35g-5h)>>7 \qquad (14).$$

The coefficient values sum to 128, and the product of the filtering is right-shifted by 7 bits. The approximate bicubic filters $F_2$ and $F_3$ approach the pure bicubic filter in terms of performance, but have lower resolution, as shown in the following equation.

$$(-7e+105f\ 30\ 35g-5h)>>7 \approx (-3.5e+52.5f+ 17.5g-2.5h)>>6 \approx (-4e+53f+18g-3h)>>6 \qquad (15).$$

In many cases, using a pure bicubic filter results in loss of bits of precision in multi-stage interpolation, so the normalization factor for the approximate bicubic filter is reduced by at least ½ (i.e., the right shifting is lessened by 1 bit or more). The filter coefficients chosen for the approximate bicubic filter of equation (15) are based on rounding the true bicubic filter, after taking into account frequency domain behavior (e.g., to preserve high-frequency information) and empirical behavior (e.g., to attain the lowest distortion given a certain bitrate). Specifically, filters $F_2$ and $F_3$ still include four filter coefficients. (In general, using fewer filter coefficients in a filter speeds up implementation, but enough filter coefficients should be used to address noise in an adjacent pixel.) The filter coefficient values are adjusted to sum to 64, which facilitates implementation using 16-bit arithmetic while approximating the higher-resolution bicubic filter. Other filter coefficient values totaling 64 can also be used, while still approximating the bicubic filter. A filter that performs substantially like a pure bicubic filter, but has less support and/or lower resolution, is termed an "approximate" bicubic filter. One way to objectively measure whether a filter performs substantially like a pure bicubic filter is to check if the approximate filter correlates well (i.e., within a defined threshold) with the pure bicubic filter. In one implementation, correlation is measured by the cosine of the angle between the vectors for the filters (desired to be as close to 1 as possible), and the threshold is 0.95. Other objective or subjective measures, other correlation measures, and/or thresholds may also be used. For example, the filter coefficients of the approximate bicubic filter may be selected so that their sum is some other value that facilitates efficient Fourier transformation or other mathematical manipulation.

Figure 7:
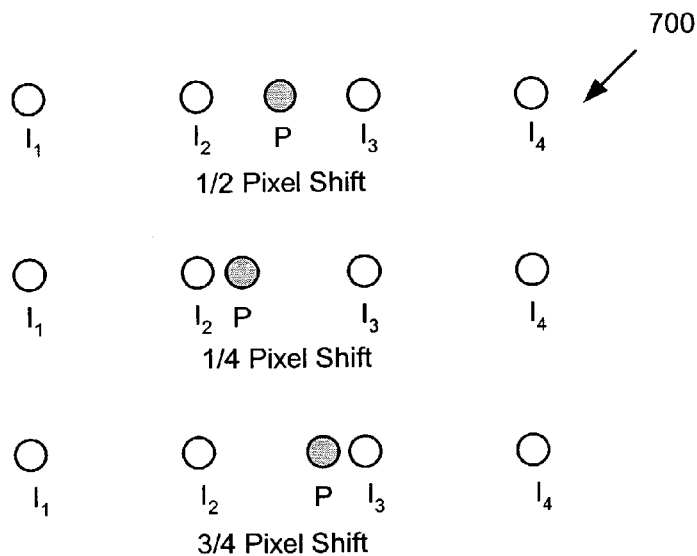
FIG. 7 is a chart showing integer-pixel locations having pixel values used to compute interpolated pixel values for sub-pixel locations.

As more fully described below, FIG. 7 generally shows the integer pixel locations with pixel values that are used to compute interpolated pixels for each of the cases corresponding to the bicubic filters outlined in equations (11)–(13). P denotes the sub-pixel position for which a pixel value is computed. $I_1$, $I_2$, $I_3$ and $I_4$ represent integer-pixel positions along the dimension of the interpolation. FIG. 7 shows horizontal interpolation, but the same operations and arrangement of positions apply to vertical interpolation.

In alternative embodiments, an encoder and decoder use other and/or additional interpolation filters. For example, the encoder and decoder use a bilinear (i.e., a 2-tap) filter to interpolate the value. For instance, with reference to the sub-pixel positions in FIG. 6, the interpolation filters used to determine the values of $P_1$, $P_5$ and $P_7$ may be the filters illustrated in equations (1)–(3).

B. One-dimensional Interpolation

For various sub-pixel positions, the encoder and decoder of some embodiments compute an interpolated value in only one dimension. As is illustrated in FIG. 7, the following equations show the operation of the filters $F_1$ (half-pixel shift), $F_2$ (quarter-pixel shift), and $F_3$ (three-quarter-pixel shift) when interpolating between integer pixels:

$$F_1: (-1l_1 + 9l_2 + 9l_3 - 1l_4 + 8 - r) >> 4 \quad (16),$$

$$F_2: (-4l_1 + 53l_2 + 18l_3 3l_4 + 32 - r) >> 6 \quad (17), \text{ and}$$

$$F_3: (-3l_1 + 18l_2 + 53l_3 - 4l_4 + 32 - r) >> 6 \quad (18),$$

where the value, r controls rounding. The value r depends on the binary frame-level rounding control parameter R and the interpolation direction as follows:

$$r = \begin{cases} 1 - R & \text{(vertical direction)} \\ R & \text{(horizontal direction).} \end{cases} \quad (19)$$

To further illustrate one-dimensional interpolation, $P_1$ and $P_5$ of FIG. 6 show half-pixel positions in the reference frame (600) that require interpolation in only one dimension (i.e., the horizontal direction for $P_1$ and the vertical direction for $P_5$). The following equations show the operation of the filter $F_1$ (half-pixel shift) when interpolating between integer pixels for $P_1$ and $P_5$:

$$P_1 = (-1e + 9f + 9g - 1h + 8 - r) >> 4 \quad (20), \text{ and}$$

$$P_5 = (-1b + 9f + 9j - 1n + 8 - r) >> 4 \quad (21),$$

Similarly, $P_0$ and $P_2$ of FIG. 6 show quarter-pixel positions in the reference frame (600) that require interpolation in only one dimension. The following equations show the operation of the filter $F_2$ (quarter-pixel shift) when interpolating between integer pixels for $P_0$ and $P_2$:

$$P_0 = (-4e + 53f + 18g - 3h + 32 - r) >> 6 \quad (22), \text{ and}$$

$$P_2 = (-4b + 53f + 18j - 3n + 32 - r) >> 6 \quad (23),$$

The approximate quarter-pixel bicubic filter $F_2$ may also be used with only a small modification to calculate three-quarter-pixel positions. For instance, the following equation shows the operation of the filter $F_3$ (three-quarter-pixel shift) when interpolating between integer pixels for $P_8$:

$$P_8 = (-3b + 18f + 53j - 4n + 32 - r) >> 6 \quad (24).$$

Alternatively, an encoder and decoder use other and/or additional interpolation filters for half-pixel, quarter-pixel, or three-quarter-pixel shifted positions in one dimension. For example, the encoder and decoder use filters with more or fewer filter coefficients, different filter coefficients, different rounding, or no rounding.

C. Multi-dimensional Interpolation

In some embodiments, interpolation is performed for sub-pixel positions that are offset in two dimensions. In FIG. 6, for instance, $P_3$, $P_4$, $P_6$, and $P_7$ are positions for which interpolation occurs in both the horizontal and vertical dimensions.

Figure 8:
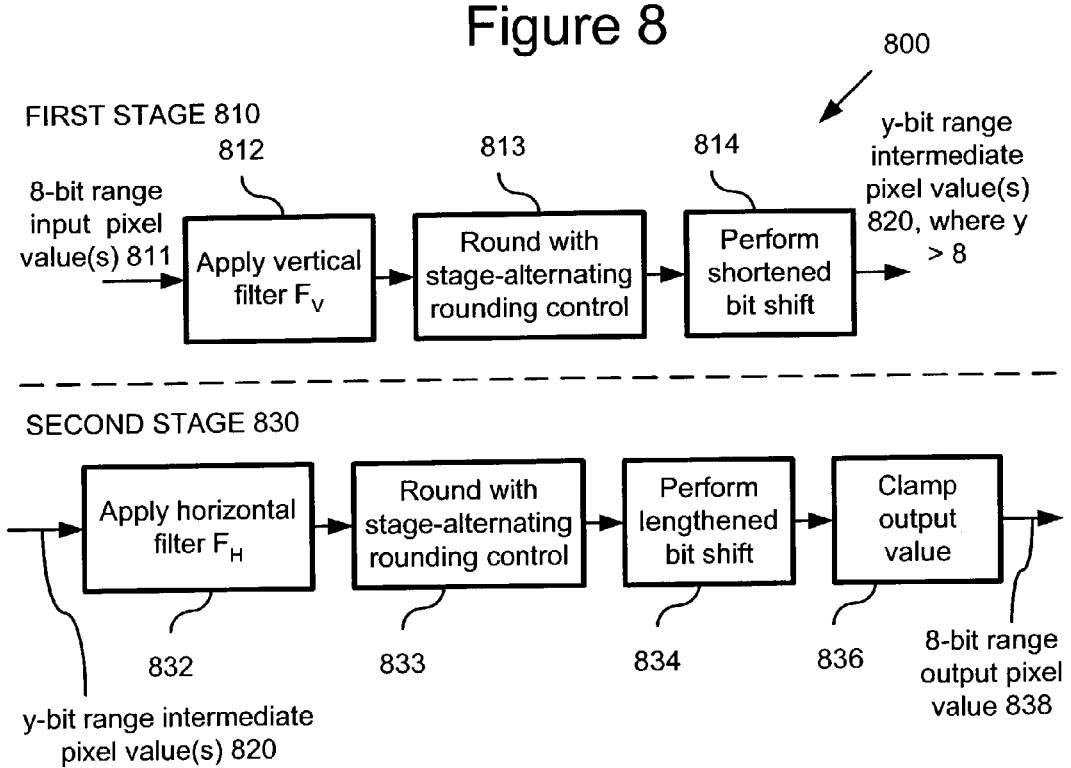
FIG. 8 is a diagram showing a two-stage interpolation technique for interpolating values at sub-pixel positions.

In one embodiment, which corresponds to the interpolation method (800) shown in FIG. 8, two-dimensional sub-pixel locations are interpolated first along the vertical direction and then along the horizontal direction. As more fully described below, interpolation is performed using one or more of the filters $F_1$, $F_2$, or $F_3$ specified above in equations (16) to (18). In the embodiment illustrated in FIG. 8, rounding is applied after both vertical filtering and horizontal filtering. The bit shifting in the rounding rule ensures retention of precision permitted by 16-bit arithmetic in the intermediate results.

In FIG. 8, vertical filtering is performed first, followed by horizontal filtering. Starting with vertical filtering improves performance in some architectures. In other embodiments, the order of the filtering is different. For instance, interpolation is performed in the horizontal direction before the vertical direction. Or, various other combinations of interpolation filters are used (e.g., multiple horizontal and/or multiple vertical filters, etc.).

The input and output pixel values (811, 838) have a bit depth of 8 bits, and have a dynamic range with 256 values. The intermediate values (820) have a bit depth of 16 bits, for a dynamic range with 65,536 values. In alternative embodiments, the input, output, and intermediate values have different (e.g., higher) bit depth.

In a first stage (810), a suitable vertical filter ($F_V$) is applied (812) to 8-bit input pixel value(s) (811). The vertical filter applied will depend on whether the selected sub-pixel position is shifted by a quarter pixel, a half pixel, or a three-quarter pixel and may take the form of one of the bicubic filters described above.

The rounding rule after vertical filtering is defined as:

$$(S + R_v) >> \text{shiftV} \quad (25),$$

where S is the vertically filtered result and $R_v = 2^{shiftV-1} - 1 + R$. R is a rounding control value that alternates between 0 and 1 on a frame-by-frame basis. Thus, the rounding rule includes rounding with stage-alternating rounding control (813) and a bit shift (814).

Right shifting potentially causes loss in resolution, so at least some of the right shifting is deferred to later stages of interpolation. The right shift value for shiftV depends on the sub-pixel position being interpolated. Specifically, shiftV={5, 3, 3, 1} for $P_3$, $P_4$, $P_6$, and $P_7$. The amount of shifting is less than that required to compensate for expansion due to the first stage filter coefficient values (e.g., the shift is less than 6-bits for the approximate bicubic filter), but enough to guarantee that the intermediate results of subsequent filtering stay within the dynamic range for intermediate values (e.g., 65,536 possible values for 16-bit words). Compared to full shifting, this shortened shift retains precision of the intermediate pixel values (820) after the first stage (810) of interpolation. The intermediate pixel values (820) have a dynamic range of y bits, where y is greater than 8 bits. The amount of shifting performed in the first stage may depend on the available bit depth and the coefficients of the interpolation filters. For instance, in the exemplary implementation described herein, intermediate values are limited to a word limit of 16 bits.

Consider point $P_3$ of FIG. 6 and input values in the range of 0 . . . 255 (8 bits). The range of intermediate values from applying the approximate bicubic filter coefficients [−4 53 18−3] to the 8-bit input values is from −1785 to 18,105 (about 14.3 bits, which rounds up to 15 bits for implementation) due to the expansion factor from the filter coefficients. Subsequent horizontal filtering applying the approximate bicubic filter coefficients (with additional expansion) to the intermediate values may produce values outside of 16-bit dynamic range, causing overflow or overflow. So, the intermediate values are shifted enough to guarantee that subsequent horizontal filtering results in a value within the 16-bit dynamic range. For $P_3$, the first shift amount is five bits, and the dynamic range of the shifted intermediate values is then from −55 to 565 (roughly 9.3 bits, which rounds up to 10 bits for implementation). The range of output from applying the approximate bicubic filter coefficients to the shifted intermediate values is then from −7,860 to 40,500, which has a dynamic range of less than 16 bits. Thus, the shortened shift is calculated such that the 16-bit word limit is fully utilized, but guaranteed not to be exceeded during the second stage (830) of interpolation.

In the second stage (830), a suitable horizontal filter ($F_H$) is applied (832) to interpolate the value at the two-dimensional sub-pixel position from the values (820) determined by the vertical filter. The rounding rule after horizontal filtering is:

$$(S+64-R)>>7 \qquad (26),$$

where S is the horizontally filtered result, and R is the rounding control value that alternates on a frame-by-frame basis. Like the first stage rounding rule, the second stage rounding rule includes rounding with stage-alternating rounding control (833) and a bit shift (834). On account of the deferred shifting in the first stage, the amount of shifting in the second stage typically exceeds that normally expected for the selected horizontal filter and is calculated to output a value having the desired dynamic range.

All of the bicubic filtering cases can potentially produce an interpolated pixel whose value is negative, or whose value is larger than the maximum for the range (e.g., 255 for 8-bit output). In these cases, 8-bit output values, the encoder and decoder clip the output value (836) to lie within the accepted range. In particular, underflows are set to 0 and overflows to 255. After clamping, an interpolated 8-bit value (838) is output.

In FIG. 8, the second stage shift is 7 bits. Thus, a filtered output value having 9 bits is retained. For instance, continuing the previous example for $P_3$, the range of the filtered output value is from −61 to 316, which has a dynamic range of roughly 8.6 bits (which rounds up to 9 bits for implementation). Although the valid range of the interpolated data is only 8 bits, the extra one bit of headroom provides overflow and underflow information. In other words, if the most significant bit (i.e., the "sign" bit) is set, there is an underflow or overflow. Specifically which of the two has occurred is derivable by looking at the remaining 8 "mantissa" bits.

Figure 9:
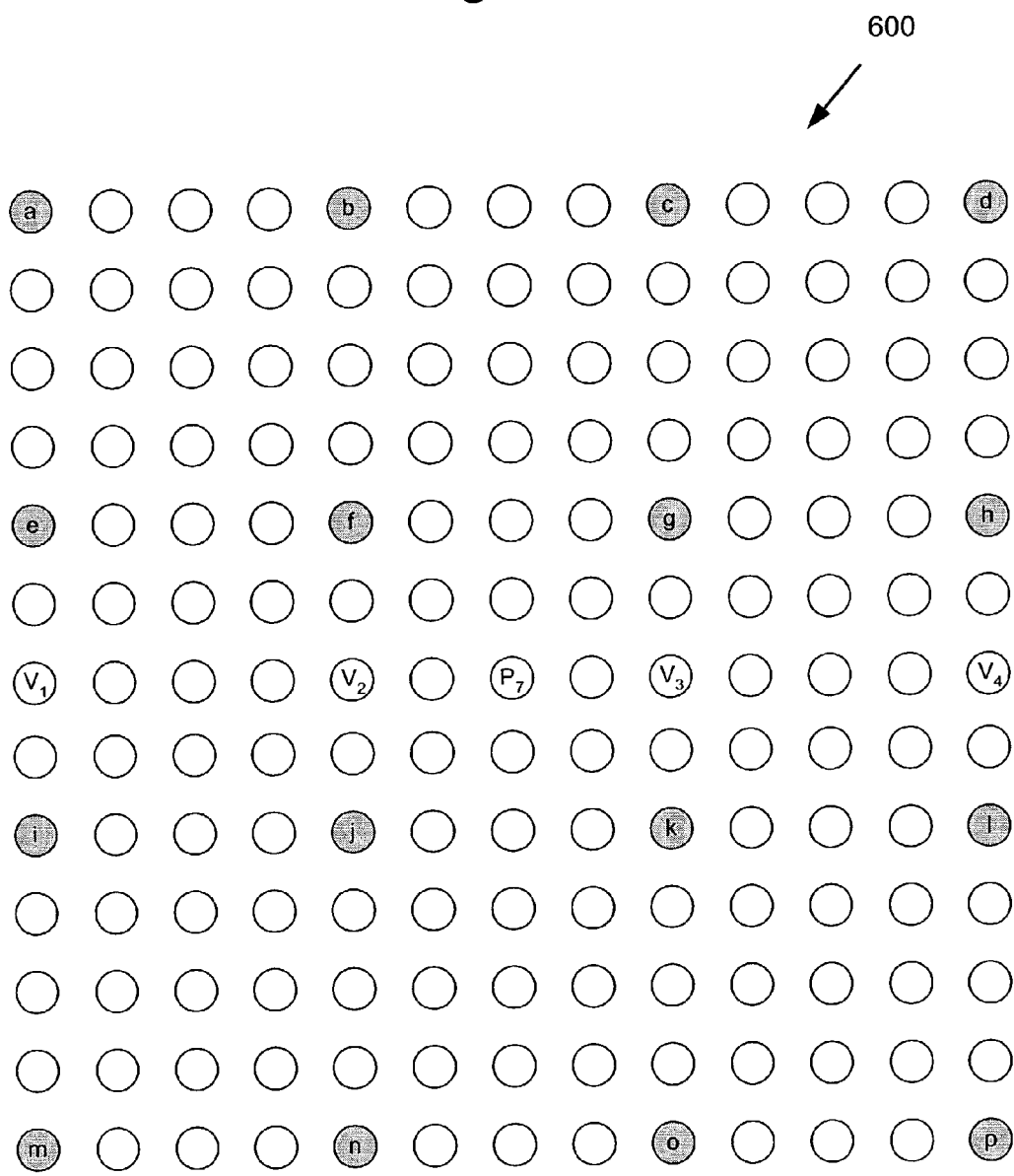
FIG. 9 is a chart showing a half-pixel horizontal, half-pixel vertical sample position and the intermediate values at sub-pixel positions used to calculate the value at the sample position.
Figure 10:
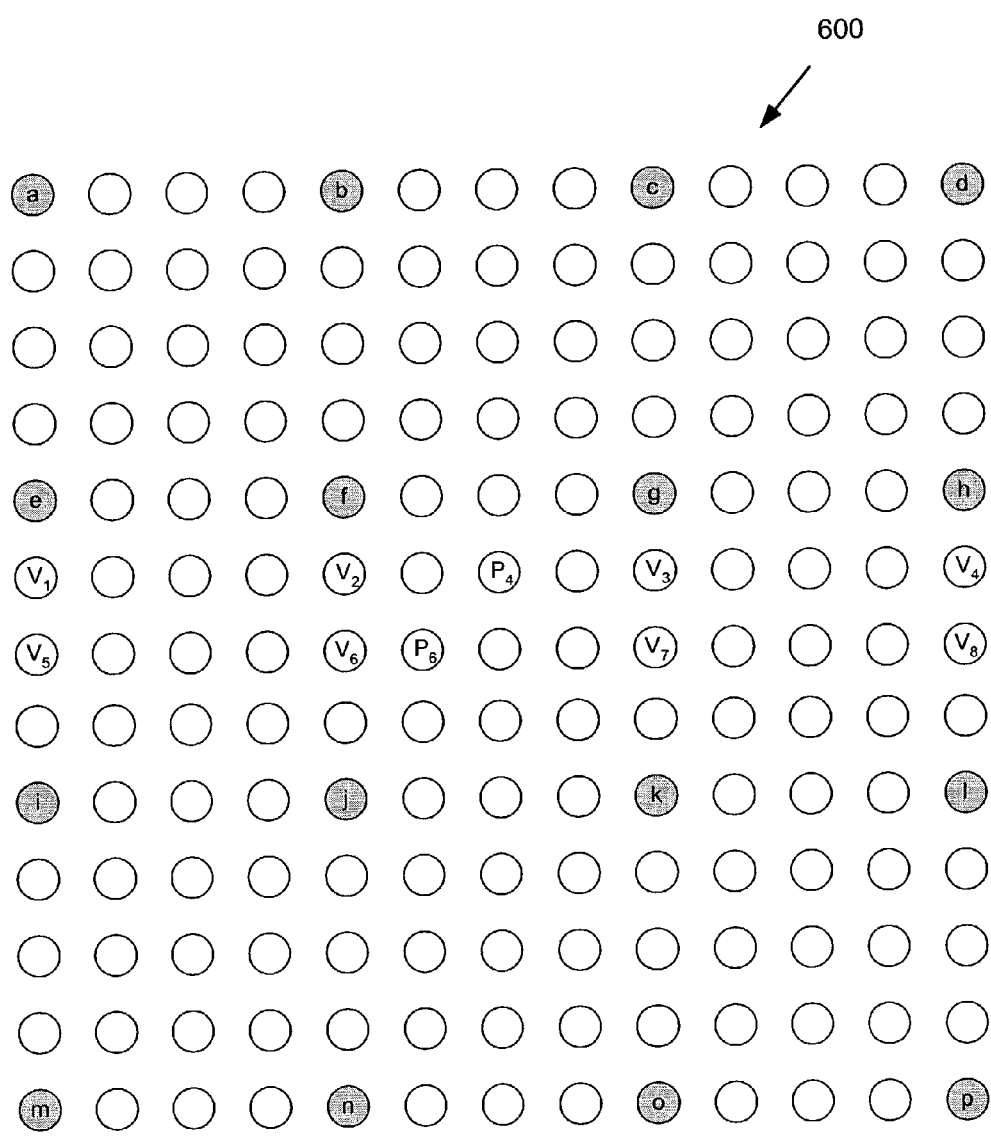
FIG. 10 is a chart showing a quarter-pixel horizontal, half-pixel vertical sample position and a half-pixel horizontal, quarter-pixel vertical sample position, and the intermediate values at sub-pixel positions used to calculate the values at the sample positions.
Figure 11:
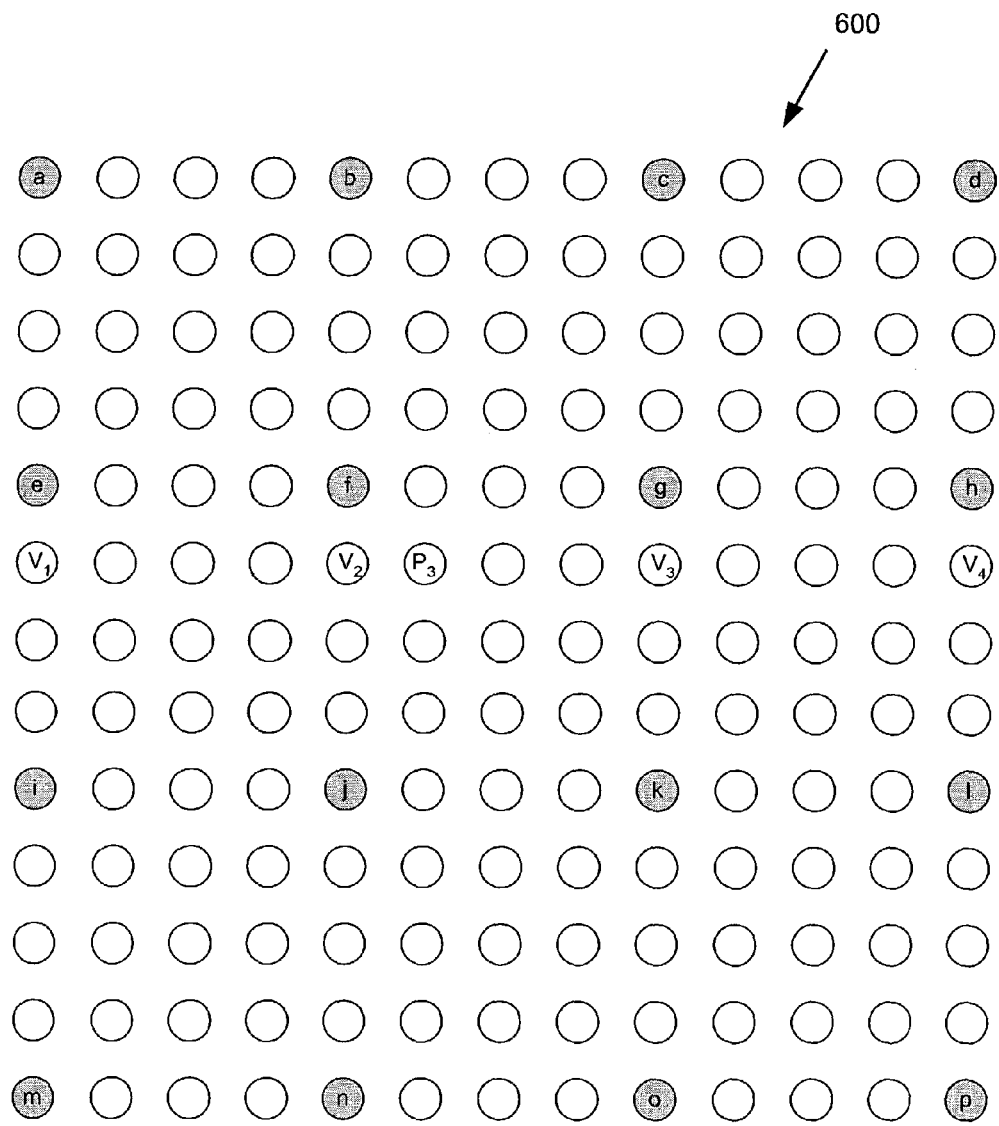
FIG. 11 is a chart showing a quarter-pixel horizontal, quarter-pixel vertical sample position and the intermediate values at sub-pixel positions used to calculate the value at the sample position.

FIGS. 9–11 further illustrate the two-dimensional interpolation described above and illustrated in FIG. 8. FIG. 9 shows sub-pixel position $P_7$ (half-pixel horizontal, half-pixel vertical) of the reference frame (600) of FIG. 6. Two half-pixel bicubic interpolation filters are used to interpolate the value of $P_7$. In the first stage, intermediate values $V_1$–$V_4$ are calculated from proximate integer pixel positions using a half-pixel bicubic filter having the general form:

$$V_{inter.}=(-1x_1+9x_2+9x_3-1x_4) \qquad (27).$$

Thus, $$V_1=(-1a+9e+9i-1m) \qquad (28),$$

$$V_2=(-1b+9f+9j-1n) \qquad (29),$$

$$V_3=(-1c+9g+9k-1o) \qquad (30), \text{ and}$$

$$V_4=(-1d+9h+9l-1p) \qquad (31).$$

After the appropriate value of $R_v$ is added, the results are right shifted by one bit. In the second stage, the intermediate results $V_1$–$V_4$ are used by a half-pixel filter to calculate the pixel value at $P_7$. In particular, a half-pixel filter having the following form is used:

$$P_7=(-1V_1+9V_2+9V_3-1V_4) \qquad (32).$$

As discussed above, the result of the second stage is right shifted by seven bits in order to obtain a 9-bit value. The 9-bit value includes eight mantissa bits and one sign bit. After any necessary clamping is performed to compensate for overflow or underflow, a final 8-bit interpolated value is output.

FIG. 10 shows sub-pixel position $P_4$ (half-pixel horizontal, quarter-pixel vertical) of the reference frame (600) of FIG. 6. A quarter-pixel and a half-pixel bicubic interpolation filter are used to interpolate the value of $P_4$. In the first stage, intermediate values $V_1$–$V_4$ are calculated from proximate integer pixel positions using a quarter-pixel bicubic filter having the general form:

$$V_{inter.}=(-4x_1+53x_2+18x_3-3x_4) \qquad (33).$$

This filter is applied to the integer pixel values of the reference frame (600) in the same manner as described above with respect to calculating $P_7$. After the appropriate value of $R_v$ is added, the results are right shifted by three bits. In the second stage, the intermediate results $V_1$–$V_4$ are used by a half-pixel filter to calculate the pixel value at $P_4$. In particular, a half-pixel filter having the following form is used:

$$P_4=(-1V_1+9V_2+9V_3-1V_4) \qquad (34).$$

The result of the second stage is right shifted by seven bits in order to obtain a 9-bit value, any necessary clamping is performed, and a final 8-bit interpolated value is output.

FIG. 10 also shows a sub-pixel position $P_6$ (quarter-pixel horizontal, half-pixel vertical). In order to interpolate the value of $P_6$, the technique for interpolating $P_4$ is used with only slight modification. In the modified technique, a half-pixel bicubic filter is used in the first stage to determine the intermediate values. The intermediate pixel locations are shown in FIG. 10 at $V_5$–$V_8$. During the second stage, a quarter-pixel bicubic filter uses the intermediate values to calculate the value of $P_6$. In particular, a quarter-pixel bicubic filter having the following form is used:

$$P_6=(-4V_5+53V_6+18V_7-3V_8) \qquad (35).$$

The amount of the shifting in the first and second stages are the same as in the technique for calculating $P_4$ (i.e., the first stage shift is three and the second stage shift is seven).

FIG. 11 shows a sub-pixel position $P_3$ (quarter-pixel horizontal, quarter-pixel vertical) of the reference frame (600) of FIG. 6. Two quarter-pixel bicubic interpolation filters are used to interpolate the value of $P_3$. In the first stage, intermediate values $V_1$–$V_4$ are calculated from proximate integer pixel positions using a quarter-pixel bicubic filter having the general form:

$$V_{inter.}=(-4x_1+53x_2+18x_3-3x_4) \quad (36).$$

This filter is applied to the integer pixel values of the reference frame (600) in the same manner as described above with respect to calculating $P_4$. After the appropriate value of $R_v$ is added, the results are right shifted by five bits. In the second stage, the intermediate results $V_1$–$V_4$ are used by another quarter-pixel bicubic filter to calculate the pixel value at $P_3$. In particular, a quarter-pixel filter having the following form is used:

$$P_3=(-4V_1+53V_2+18V_3-3V_4) \quad (37).$$

The result of the second stage is right shifted by seven bits in order to obtain a 9-bit value, any necessary clamping is performed, and a final 8-bit interpolated value is output.

Although not shown in FIGS. 9–11, the values of sub-pixel positions having three-quarter-pixel shifts in one or both of the dimensions may also be computed. In order to compute such sub-pixel position, the methods outlined above may be modified by using the appropriate three-quarter-pixel bicubic filters in place of the quarter-pixel bicubic filters.

In other embodiments, bilinear filters or a combination of bilinear and bicubic filters are used to interpolate the values at the sub-pixel sample positions. The use of bilinear filters generally reduces the amount of shifting that is performed (after the first stage and overall) because the coefficients introduce less expansion than with bicubic filters. In one implementation using bilinear filters and 16-bit intermediate values, for instance, no shifting is performed in the first stage, thereby maximizing the use of the 16-bit word limit, and a right shift of 4 bits is performed after the last stage. Similarly, clamping may be deferred until the last stage.

One of the principles underlying the methods described above is the use of the highest possible accuracy at every stage of filtering while staying within a desired "word size" limit W. If the output value has a dynamic range of D bits, and L bits are discarded at the last stage, the output of the last stage of filtering can take up to D+L+1 bits, where the one extra bit is used for signaling underflows and overflows. Working backwards, if the last stage of filtering results in an expansion by k bits, then the input to the last stage should be within D+L−k. Thus, in order to keep maximum accuracy with a W-bit representation, the following relationship exists:

$$D+L+1=W \quad (38).$$

Further, the input to last stage should be D+L−k=W−k−1 bits.

The above logic can be recursively applied to the penultimate stage of filtering, and so on. In fact, the bounds can be tightened by using fractional bits to represent non-$2^k$ ranges and expansion factors.

FIGS. 12–15 are diagrams illustrating various techniques that are described in combination above, but that are also separately applicable to multi-stage interpolation. FIGS. 12–15 do not show the various ways in which the respective multi-stage interpolation (1200, 1300, 1400, 1500) can be used in conjunction with other multi-stage interpolation techniques.

Also, although each of FIGS. 12–15 shows two stages, the multi-stage interpolation (1200, 1300, 1400, 1500) techniques illustrated in FIGS. 12–15 may include more stages. More generally, the multi-stage interpolation (1200, 1300, 1400, 1500) techniques may be implemented with any type of separable filters in multiple dimensions, as well as arbitrary filters implemented in a cascade, trellis, or lattice structure.

FIGS. 12–15 show generalized input values, output values, and filters used in multi-stage interpolation. The specific choice of bit depth for the input values of the first stage, the output values of the last stage, and the intermediate values can be extended arbitrarily in accordance with the technical specifications of a target architecture or application. For example, the input values may be 8-bit pixel values at integer-pixel positions in reference frames, the output values may be 8-bit pixel values at sub-pixel positions in reference frames, and the filters may be regular and approximate bicubic filters (as described above with reference to FIGS. 6–8). Alternatively, the input values and/or output values have dynamic ranges of different bit depth, or different filters are used.

A component such as the encoder or decoder described with reference to FIGS. 4 and 5, respectively, may perform the multi-stage interpolation (1200, 1300, 1400, 1500). Alternatively, another encoder or decoder, or another type of component, may perform the multi-stage interpolation (1200, 1300, 1400, 1500).

Figure 12:
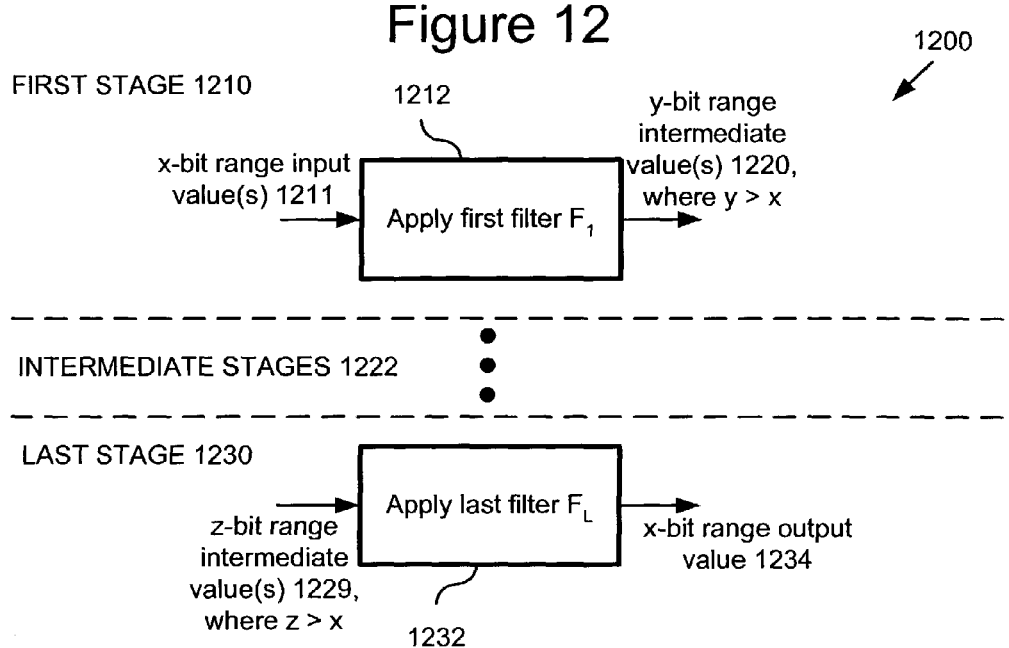
FIG. 12 is a diagram showing a multi-stage interpolation technique with enhanced dynamic range (in bits) intermediate values.

FIG. 12 shows a diagram of multi-stage interpolation (1200) with enhanced dynamic range (in bits) for intermediate interpolated values. In the first stage (1210), the component applies (1212) a first filter $F_1$ to one or more x-bit range input values (1211), producing one or more y-bit range intermediate values (1220), where y is greater than x. For example, the y-bit intermediate values are pixel values having a dynamic range greater than 8 bits, and the x-bit input values have a dynamic range of 8 bits.

In each of zero or more intermediate stages (1222), which are not shown in detail, the component applies a filter to the y-bit range intermediate values (1220). The output from the intermediate stages is one or more z-bit range intermediate values (1229), where z is greater than x. (In FIGS. 12–15, If the last stage is the second stage, the intermediate values output from the first stage are the input intermediate values to the last stage.)

In the last stage (1230), the component applies (1232) a last filter $F_L$ to the one or more z-bit range intermediate values (1229). The final output is an x-bit range output value (1234). For each of the multi-stage interpolation (1200, 1300, 1400, 1500) techniques, if necessary, the component repeats the multi-stage interpolation (1200, 1300, 1400, 1500) for additional output values. In the repeated interpolation, the component may reuse certain intermediate values computed in previous interpolations.

Figure 13:
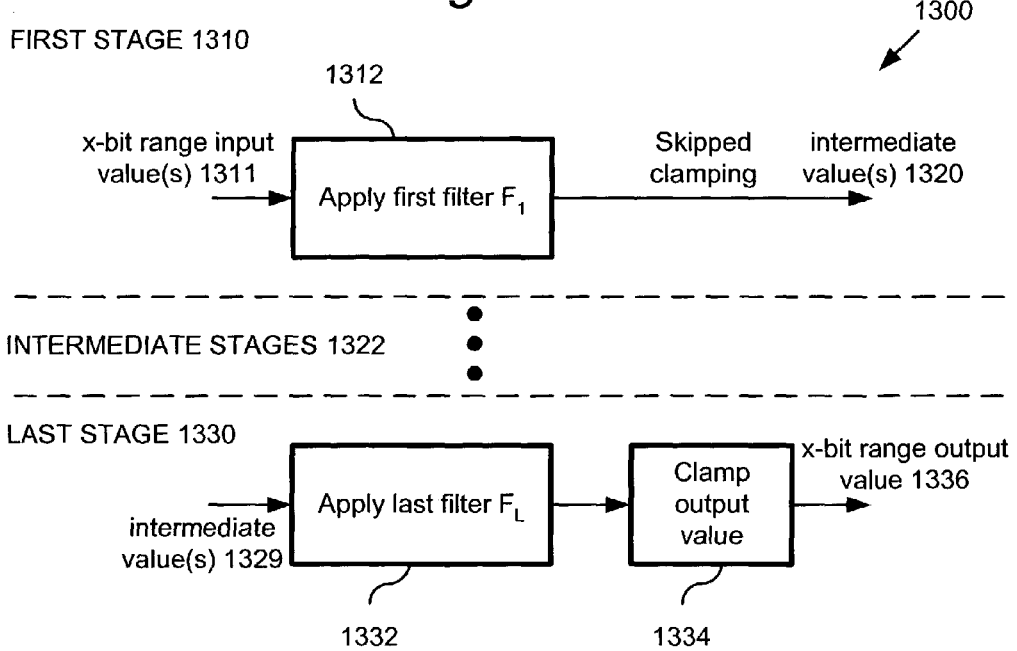
FIG. 13 is a diagram showing a multi-stage interpolation technique with skipped clamping.

FIG. 13 shows a diagram of multi-stage interpolation (1300) with skipped clamping. Deferring clamping speeds up computation, for example, since the component no longer checks each intermediate value against upper and lower bounds of the range. Deferring clamping also preserves precision in the intermediate values.

In the first stage (1310), the component applies (1312) a first filter $F_1$ to one or more x-bit range input values (1311). After application of the first filter $F_1$, no clamping is performed. Thus, the one or more intermediate values (1320) output from the first filter $F_1$ may have a dynamic range greater than x bits. For example, the input values are 8 bit values, and the output from the first filter $F_1$ has a dynamic range of 9 or more bits due to the expansion factor introduced by the coefficients of the first filter $F_1$.

In each of zero or more intermediate stages (1322), which are not shown in detail, the component applies a filter to the one or more unclamped intermediate values (1320). Clamping may also be skipped in the zero or more intermediate stages (1322). The intermediate values (1329) output from the zero or more intermediate stages (1322) are input to a last stage (1330), in which the component applies (1332) a last filter $F_L$ to the values (1329). The final output from the last filter $F_L$ is clamped (1334) and an x-bit range value (1336) is output.

FIG. 14 shows a diagram of multi-stage interpolation (1400) with deferred bit shifting. In the first stage (1410), the component applies (1412) a first filter $F_1$ to one or more x-bit range input values (1411). In conjunction with or after application of the first filter $F_1$, a shortened shift (1414) is performed. The shortened shift (1414) is less than that required to guarantee an x-bit range output value (in view of the expansion factor of the coefficients of the first filter $F_1$), and thus is less than that typically associated with the first filter $F_1$. Accordingly, the shortened shift (1414) produces one or more intermediate values having a dynamic range (of y bits) greater than x bits. For example, the input values have dynamic range of 8 bits, and the intermediate values have a dynamic range of greater than 8 bits.

In each of zero or more intermediate stages (1422), which are not shown in detail, the component applies a filter to the one or more intermediate values (1420). One or more intermediate values (1429) having a dynamic range of z bits (greater than x bits) are output from the zero or more intermediate stages (1422) and, in a last stage (1430), the component applies (1432) a last filter $F_L$ to the values (1429). The final output from the last filter $F_L$ is shifted (1434) by an amount larger than that typically associated with the last filter $F_L$, thereby contracting the dynamic range of output value (1434) to a specified bit depth. For example, the dynamic range (in bits) of the output value (1434) is equal to x or x+1. In one implementation, the shifting of the first stage and any intermediate stage is deferred as much as possible until the final stage. The amount by which the shifting is deferred may depend on the available bit depth for intermediate calculations and the expansion factors of the respective filters.

FIG. 15 shows a multi-stage interpolation technique (1500) using stage-alternating rounding control. The multiple stages in the interpolation technique (1500) alternate in how they apply rounding control to adjust rounding. This helps prevent the accumulation of rounding error from frame to frame in certain video sequences. For example, if a low-quality video sequence includes gradual motion in one dimension (panning) or two dimensions (zooming), accumulation of rounding error may result in gradual color fading from frame to frame, which can cause perceptible artifacts. Stage-alternating rounding control helps prevent such color fading.

A numerical example may help illustrate rounding in which stage-alternating rounding control is applied before right bit shifting. The right bit shifting essentially results in division and truncation of the right shifted value. Adding a rounding value before shifting causes the shifted value to be rounded up or down (to the nearest integer), rather than always be rounded down (truncated). Using rounding control changes the direction of rounding (up or down) for a marginal value. For example, suppose in each of the multiple stages, the output of filtering is adjusted by adding ½ of the "divisor" of a right shift before the right shift (e.g., adding $2^4=16$ before a 5-bit right shift, adding $2^6=64$ before a 7-bit right shift). The effect of this addition is to round up (to the next, higher integer) values that would have a fractional component of 0.5 or higher (after a division corresponding to the bit shift). Such values would otherwise be truncated (to the next, lower integer) by the right shift. Regardless of the addition, values that would have a fractional component of less than 0.5 (after a division corresponding to the bit shift) are still truncated (to the next, lower integer) by the right shift. Rounding control then changes the direction of rounding for certain marginal values. For example, in each of the multiple stages, the output of the filtering is further adjusted by subtracting 0 or 1 (the alternating rounding control value) before the right shift (e.g., $2^{shiftV-1}$ or $2^{shiftV-1}-1$). The effect of the rounding control adjustment is to change the direction of rounding for values that would have a fractional component of 0.5 (after a division corresponding to the bit shift). When 1 is subtracted, such marginal values are rounded down. Otherwise, such marginal values are rounded up.

Each of the multiple stages use a rounding control value that alternates between 0 and 1 before the multi-stage interpolation, so the different stages alternate in how the rounding control value is applied. Alternatively, the multi-stage interpolation technique (1500) uses a rounding control value that itself alternates from stage to stage.

In the first stage (1510) of FIG. 15, the component applies (1512) a first filter $F_1$ to one or more x-bit range input values (1511). In conjunction with or after application of the first filter $F_1$, rounding (1514) is performed on the output from the first filter $F_1$. The rounding (1514) is adjusted by stage-alternating rounding control. For example, in the first stage (1510), the stage-alternating rounding control causes the output value to be rounded upward to the nearest integer if the output value is a marginal value (where the output value would otherwise be rounded downward). One or more rounded intermediate values (1520) are output from the first stage and into a second stage (1530).

In the second stage (1530), the component applies (1532) a second filter $F_2$ to the one or more intermediate values (1520). Rounding (1534) is performed on the output from the second filter $F_2$. In conjunction with or after application of the second filter $F_2$, rounding (1534) is performed with stage-alternating rounding control, with the rounding control causing rounding in the opposite direction as the first stage for marginal values. For example, in the second stage (1530), the stage-alternating rounding control causes the output value to be rounded downward to the nearest integer if the output value is the marginal value. One or more intermediate values (1536) are output from the second stage and may be used in zero or more additional stages (1540). The zero or more additional stages (1540) may further include stage-alternating rounding control.

The alternating rounding control is not limited to being applied in consecutive stages, but may be applied in various other combinations of stages. Further, the first direction may be dependent on a number of parameters. For example, in a video encoder and decoder, the first direction may depend on the rounding control used in the previous frame or on the type of frame being interpolated (e.g., an I-frame, P-frame, or B-frame). In other embodiments, the first direction may be set to a constant, derived implicitly from causal information (e.g., from past coded/decoded information), derived using a pseudorandom generator, or signaled as part of the bitstream. The stage-alternating rounding control may be applied in multi-stage interpolation using any of a variety of interpolation filters, including bilinear, bicubic, and approximate bicubic filters.

D. Chrominance Motion Vectors

Since chrominance (chroma) motion vectors are implicitly derived from co-located luminance motion vectors, their accuracy is limited and offers scope for simplification. This simplification can reduce the computational complexity of sub-pixel interpolation for chrominance values in the encoder and decoder without significantly decreasing the perceived quality of the coded video. In addition, the encoder and decoder can switch between different modes for chrominance motion vector rounding and interpolation. For example, one mode emphasizes quality in the coded video at the expense of greater computational complexity. Another mode emphasizes computational simplicity at some cost to quality.

In one implementation, a video encoder and decoder use a sequence-level 1-bit field "FASTUVMC" to control the sub-pixel interpolation for chrominance values and the rounding of chrominance motion vectors. Thus, the video encoder and decoder selectively operate in one of two different chrominance-rounding modes, a fast mode and a basic mode.

Figure 16:
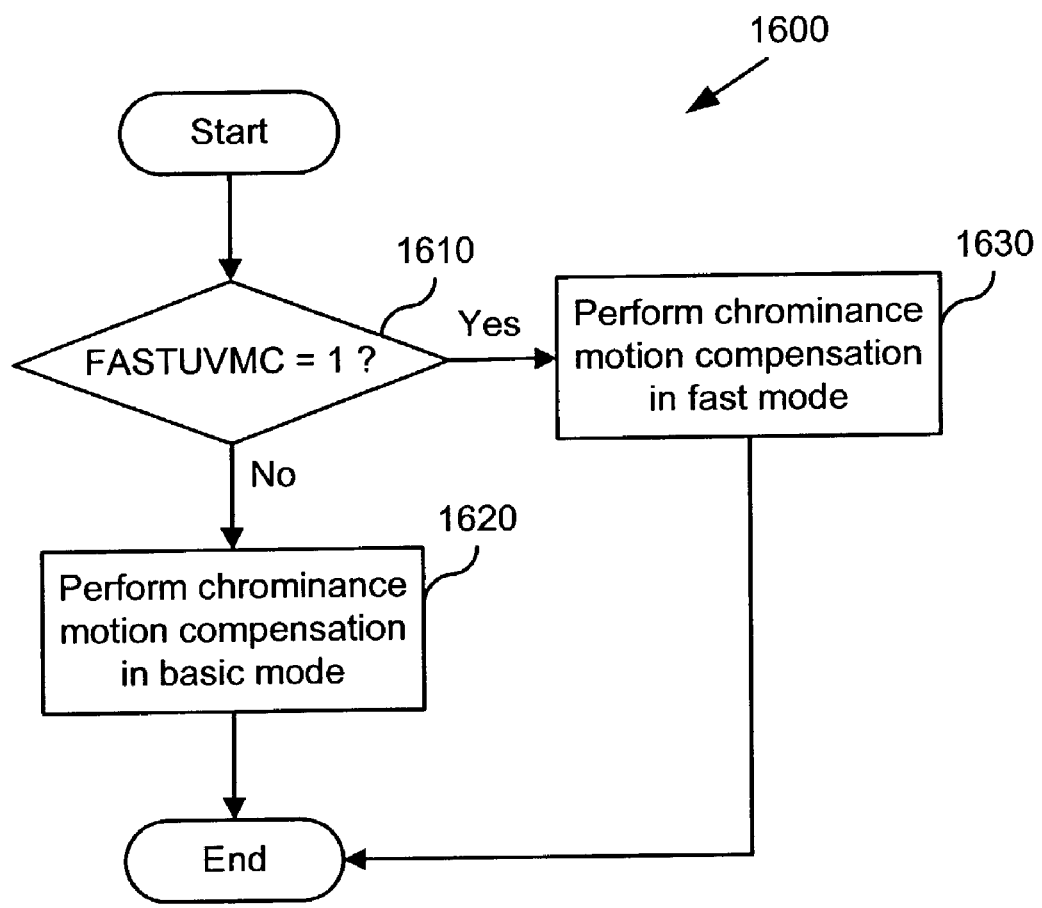
FIG. 16 is a flowchart showing a technique for selecting between multiple chrominance-rounding and interpolation modes.

FIG. 16 shows a technique (1600) for selecting between multiple chrominance-rounding and interpolation modes. For example, a video encoder or decoder such as one described above with reference to FIGS. 4 and 5, respectively, performs the technique.

The video encoder or decoder determines (1610) whether a one-bit flag FASTUVMC indicates to use a fast chrominance motion compensation mode (flag=1) or basic chrominance motion compensation mode (flag=0). For example, the flag is a sequence-level field, corresponding to a user setting, which an encoder writes in the bitstream of coded video and a decoder reads from the bitstream. Alternatively, the encoder and decoder use more bits to signal a chrominance-rounding and/or an interpolation mode using fixed length or variable length codes, for example, to select between more than two available modes. Or, instead of being a sequence-level field corresponding to a user setting, the switching information is signaled elsewhere in the bitstream and/or set according to different criteria.

The video encoder or decoder then performs chrominance motion compensation in basic mode (1620) or fast mode (1630). The details of basic mode (1620) and fast mode (1630) motion vector rounding and interpolation are given below for one implementation. Alternatively, these modes have different implementations. For example, the lookup table used in the fast mode (1630) implementation described below is changed to a different mapping to result in a desired performance level for a specific hardware architecture, or changed to work for motion vectors of different accuracies. Instead of or in addition to the basic mode (1620) and the fast mode (1630), the encoder or decoder may use other modes for chrominance motion vector rounding and interpolation.

In one implementation, in fast mode, (e.g., if the chrominance-rounding flag=1) the chrominance motion vectors that are at quarter-pixel offsets (i.e., one-quarter-pixel and three-quarter-pixel offsets) are rounded to the nearest full-pixel positions, the chrominance motion vectors that are at half-pixel offsets are left unrounded, and bilinear filtering is used for all chrominance interpolation. In this mode, the speed of the encoder and decoder is increased. The motivation for this optimization is the significant difference between the complexities of interpolating pixel offsets that are at: (a) integer-pixel positions; (b) half-pixel positions; (c) a quarter-pixel position for at least one coordinate (of x and y); and (d) a quarter-pixel position for both coordinates. The ratio of a:b:c:d is roughly 1:4:4.7:6.6. By applying this fast mode, one can favor (a) and (b), thus cutting down on decoding time. Because this is performed only for chrominance interpolation, the coding and quality loss (especially visible quality) are both negligible.

In this fast mode, a final level of rounding is done on the chrominance motion vectors as follows:

```
//RndTbl[−3]=−1, RndTbl[−2]=0, RndTbl[−1]=+1,
    RndTbl[0]=0//RndTbl[1]=−1, RndTbl[2]=0,
    RndTbl[3]=+1cmv_x=cmv_x+
    RndTbl[cmv_x% 4];
    cmv_y=cmv_y+RndTbl[cmv_y% 4];                    (39)
``` where cmv_x and cmv_y represent the x and y coordinates of the chrominance motion vector in units of quarter pixels and % represents the modulus (or remainder) operation, which is defined thus: (x % a)=−(−x % a). (The modulus of a negative number is equal to the negative of the modulus of the corresponding positive number.) Thus, when cmv_x (or cmv_y) is divisible by 4, then the chrominance motion vector has an integer offset. When cmv_x % 4=+/−2, then the chrominance motion vector has a half-pixel offset. And, when cmv_x % 4=+/−1 or +/−3, then the chrominance motion vector has a quarter-pixel offset. As can be seen by the above re-mapping operation, the quarter pixel positions are disallowed by rounding the chrominance motion vector to the nearest integer position (half-pixel positions are left unaltered). Thus, this mode remaps chrominance coordinates to integer and half-pixel positions. Bilinear filtering may be used for all chrominance interpolations in this mode for further speedup. Although this fast mode implementation is described in combination with selection between multiple rounding modes, the fast mode implementation can alternatively be used independently (i.e., as the only possible mode).

Figure 17:
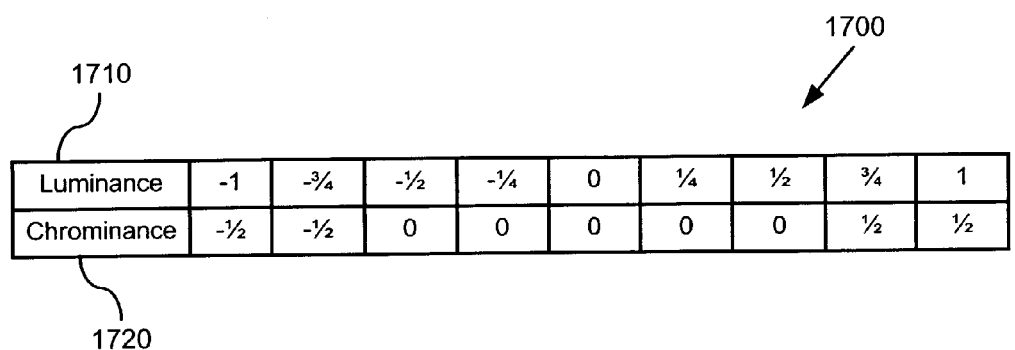
FIG. 17 is a table showing a first chrominance-rounding mode.

FIG. 17 is a table (1700) illustrating this fast mode of chrominance rounding. The first row (1710) shows luminance motion vector values at quarter-pixel accuracy. Although the luminance motion vector values are shown in terms of their fractional-offset from integer pixel values, they could be represented as integer values where each integer represents a quarter-pixel increment (i.e., 0, 1, 2, 3, 4 instead of 0, ¼, ½, ¾, 1). The second row (1720) shows how the corresponding chrominance motion vector values are rounded in the fast mode so that they have integer and half-pixel accuracy.

In the second, basic mode of this implementation (e.g., if the chrominance-rounding flag=0), the chrominance motion vectors that are at quarter pixel offsets with no rounding error remain at quarter pixel offsets. The chrominance motion vectors at other sub-pixel offset are rounded to the nearest full-pixel or half-pixel position. In this mode, the speed of the decoder may be slower than other modes, but the accuracy with which chrominance pixel values are calculated is higher. Thus, this basic mode remaps chrominance coordinates to integer, half-pixel, and quarter-pixel positions. Bicubic or bilinear filtering as described above may be used for chrominance interpolation.

Figure 18:
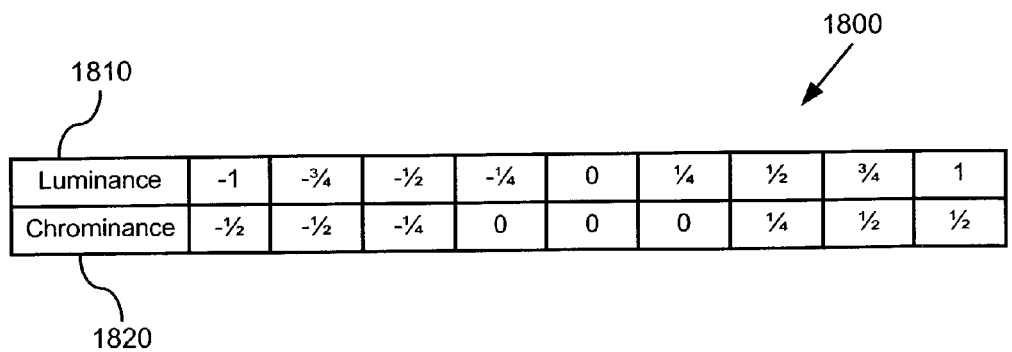
FIG. 18 is a table showing a second chrominance-rounding mode.

FIG. 18 is a table illustrating this basic mode of chrominance rounding. The first row (1810) shows luminance motion vector values at quarter-pixel accuracy. The third row (1830) shows how the corresponding chrominance motion vector values are rounded in the basic mode described above so that they have integer, half-pixel, and quarter-pixel accuracy. In other implementations, the chrominance space is rounded to other resolutions in chrominance space.

Having described and illustrated the principles of our invention with reference to various embodiments, it will be recognized that the various embodiments can be modified in arrangement and detail without departing from such principles. For instance, the principles and techniques described above are not limited to use in a video encoder and/or video decoder. Instead, they may be applied in any computing context where a value is calculated based in part on one or more intermediate values or where separable filters are used in multiple dimensions.

It should be understood that the programs, processes, or methods described herein are not related or limited to any particular type of computing environment, unless indicated otherwise. Various types of general purpose or specialized computing environments may be used with or perform operations in according with the teachings described herein. Elements of embodiments shown in software may be implemented in hardware and vice versa.

In view of the many possible embodiments to which the principles of our invention may be applied, we claim as our invention all such embodiments as may come within the scope and the spirit of the following claims and equivalents thereto.

I claim:

1. In a computer system, a computer-implemented method comprising:
    buffering a reference video frame; and
    performing motion compensation for at least part of a current video frame relative to the reference video frame, including computing a value at a quarter-sample position by multi-stage interpolation having first and second stages, including in the first stage,
        using an approximate bicubic filter having filter coefficients and a normalization factor; and
        right bit shifting in an amount corresponding to the normalization factor to compensate for some expansion due to the first coefficients in the first stage, the normalization factor being reduced in order to facilitate deferral to the second stage of compensation for other expansion due to the filter coefficients in the first stage.

2. The method of claim 1 wherein the approximate bicubic filter is the only filter used to compute the value at the quarter-sample position.

3. The method of claim 1 wherein the approximate bicubic filter includes filter coefficients having a sum that facilitates Fourier transformation.

4. The method of claim 1 wherein the approximate bicubic filter includes filter coefficients having a sum of 64.

5. The method of claim 1 wherein the approximate bicubic filter has filter coefficients of −4, 53, 18, and −3.

6. The method of claim 1 further comprising repeating the computing for each of one or more additional quarter-sample positions.

7. The method of claim 1 wherein the value is a pixel value and the quarter-sample position is a quarter-pixel position in the reference video frame.

8. A computer-readable medium storing computer-executable instructions for causing the computer system to perform the method of claim 1 during video encoding.

9. A computer-readable medium storing computer-executable instructions for causing the computer system to perform the method of claim 1 during video decoding.

10. The method of claim 1 wherein the normalization factor is selected to fully utilize but not exceed an available bit depth in the second stage.

11. The method of claim 10 wherein the available bit depth is 16 bits.

12. The method of claim 1, further comprising, during video encoding:
    performing motion estimation for the at least part of the current video frame relative to the reference video frame, wherein the motion estimation also includes the computing; and
    outputting an encoded video bit stream that is based at least in part on results of the motion estimation and the motion compensation.

13. The method of claim 1, further comprising, during video decoding, outputting to a display a reconstructed frame that is based at least in part on results of the motion compensation.

14. A system comprising:
    means for using an approximate bicubic filter in each of first and second stages of multi-stage interpolation for a reference video frame, wherein the approximate bicubic filter has first filter coefficients with a first sum, wherein the first filter coefficients approximate second filter coefficients of a pure bicubic filter, the second filter coefficients with a second sum greater than the first sum, wherein each of the first and second stages includes right shifting to compensate for expansion due to the first filter coefficients, and wherein the use of the approximate bicubic filter facilitates deferral of at least some of the right shifting from the first stage to the second stage to increase dynamic range of intermediate values from the first stage; and
    means for performing motion compensation relative to the reference video frame.

15. The system of claim 14 wherein the first sum is 64 and the second sum 128.

16. The system of claim 14 wherein the first filter coefficients are −4, 53, 18, and −3.

17. A method comprising:
    for a first stage of bicubic interpolation, filtering samples of a reference video frame in a first dimension using an approximate bicubic filter that has filter coefficients, including bit shifting to partially compensate for expansion due to the filter coefficients in the first stage, wherein at least some bit shifting to compensate for expansion due to the filter coefficients is deferred, and wherein the filtering for the first stage produces intermediate results; and
    for a second stage of the bicubic interpolation, filtering the intermediate results in a second dimension using the approximate bicubic filter, including bit shifting to compensate for the deferred bit shifting and for expansion due to the filter coefficients in the second stage.

18. The method of claim 17 wherein the filter coefficients of the approximate bicubic filter have a sum and expansion factor that are reduced relative to the sum and expansion factor of filter coefficients of a pure bicubic filter, thereby permitting the deferred bit shifting in 16-bit arithmetic for 8-bit samples of the reference video frame.

19. The method of claim 17 wherein the approximate bicubic filter has a reduced normalization factor compared to an associated pure bicubic filter.

20. The method of claim 17 wherein the filter coefficients of the approximate bicubic filter have a sum of 64.

21. The method of claim 17 wherein the filter coefficients of the approximate bicubic filter are 4, 53, 18, and −3.

22. The method of claim 17, wherein the method is performed as part of video encoding, the method further comprising outputting an encoded video bit stream that is based at least in part on results of the bicubic interpolation.

23. The method of claim 17, wherein the method is performed as part of video decoding, the method further comprising outputting to a display a reconstructed frame that is based at least in part on results of the bicubic interpolation.

24. A computer-readable medium storing computer-executable instructions for causing a computer system to perform the method of claim 17 during video encoding.

25. A computer-readable medium storing computer-executable instructions for causing a computer system to perform the method of claim 17 during video decoding.

* * * * *